(12) United States Patent
McGarry et al.

(10) Patent No.: US 9,451,142 B2
(45) Date of Patent: Sep. 20, 2016

(54) VISION SENSORS, SYSTEMS, AND METHODS

(75) Inventors: E. John McGarry, La Jolla, CA (US); A. Piers N. Plummer, Guildford (GB)

(73) Assignee: Cognex Corporation, Natick, MA (US)

( * ) Notice: Subject to any disclaimer, the term of this patent is extended or adjusted under 35 U.S.C. 154(b) by 829 days.

(21) Appl. No.: 12/184,187

(22) Filed: Jul. 31, 2008

(65) Prior Publication Data

US 2009/0141987 A1   Jun. 4, 2009

Related U.S. Application Data

(60) Provisional application No. 60/991,545, filed on Nov. 30, 2007.

(51) Int. Cl.

| | | |
|---|---|---|
| *H04N 5/262* | (2006.01) | |
| *H04N 5/232* | (2006.01) | |
| *H04N 5/228* | (2006.01) | |
| *G06K 9/00* | (2006.01) | |
| *G06K 9/62* | (2006.01) | |
| *H04N 5/378* | (2011.01) | |

(52) U.S. Cl.
CPC .......... *H04N 5/232* (2013.01); *G06K 9/00986* (2013.01); *G06K 9/6203* (2013.01); *H04N 5/378* (2013.01)

(58) Field of Classification Search
CPC ....... H04N 5/262; H04N 5/232; H04N 5/228
USPC ....... 348/222.1, 308, 86, 294; 382/190, 195, 382/153, 312, 218, 219; 250/208.1
See application file for complete search history.

(56) References Cited

U.S. PATENT DOCUMENTS

| | | | |
|---|---|---|---|
| 5,253,308 A | 10/1993 | Johnson | |
| 5,351,309 A | 9/1994 | Lee et al. | |
| 5,495,537 A | 2/1996 | Bedrosian et al. | |
| 5,588,435 A | 12/1996 | Weng et al. | |
| 5,692,210 A | 11/1997 | Mita et al. | |
| 5,835,141 A * | 11/1998 | Ackland et al. | 348/308 |
| 6,173,070 B1 * | 1/2001 | Michael et al. | 382/145 |

(Continued)

FOREIGN PATENT DOCUMENTS

| | | |
|---|---|---|
| DE | 2421137 | 6/2006 |
| EP | 1309009 A2 | 5/2003 |

(Continued)

OTHER PUBLICATIONS

PCT International Search Report dated Oct. 22, 2008 for PCT/US08/71993.

(Continued)

*Primary Examiner* — Tuan Ho

(57) ABSTRACT

A single chip vision sensor of an embodiment includes a pixel array and one or more circuits. The one or more circuits are configured to search an image for one or more features using a model of the one or more features. A method of an embodiment in a single chip vision sensor includes obtaining an image based at least partially on sensed light, and searching the image for one or more features using a model of the one or more features. A system of an embodiment includes the single chip vision sensor and a device. The device is configured to receive one or more signals from the single chip vision sensor and to control an operation based at least partially on the one or more signals.

21 Claims, 13 Drawing Sheets

(56) References Cited

U.S. PATENT DOCUMENTS

| | | | |
|---|---|---|---|
| 6,240,208 | B1 | 5/2001 | Garakani et al. |
| 6,317,819 | B1 | 11/2001 | Morton |
| 6,411,734 | B1 | 6/2002 | Bachelder et al. |
| 6,441,482 | B1 | 8/2002 | Foster |
| 6,701,005 | B1 | 3/2004 | Nichani |
| 6,856,698 | B1 | 2/2005 | Silver et al. |
| 6,898,333 | B1 | 5/2005 | Gopalakrishnan et al. |
| 6,948,050 | B1 | 9/2005 | Gove et al. |
| 7,016,539 | B1 | 3/2006 | Silver et al. |
| 7,205,522 | B2 | 4/2007 | Krymski |
| 7,209,173 | B2 | 4/2007 | Fossum |
| 7,271,835 | B2 | 9/2007 | Iizuka et al. |
| 7,319,423 | B2 | 1/2008 | Augusto et al. |
| 7,538,814 | B2* | 5/2009 | Igarashi et al. ............... 348/349 |
| 2003/0085336 | A1 | 5/2003 | Wu |
| 2003/0128876 | A1 | 7/2003 | Yamaguchi |
| 2003/0141434 | A1 | 7/2003 | Ishikawa et al. |
| 2004/0103093 | A1 | 5/2004 | Furuhashi et al. |
| 2004/0119844 | A1 | 6/2004 | Aldrich et al. |
| 2005/0041128 | A1 | 2/2005 | Baker |
| 2005/0220363 | A1* | 10/2005 | Oldroyd ........................ 382/294 |
| 2006/0012697 | A1 | 1/2006 | Boemler |
| 2006/0186322 | A1 | 8/2006 | Matsuyama |
| 2007/0046799 | A1 | 3/2007 | Moholt |
| 2007/0076109 | A1 | 4/2007 | Krymski |
| 2007/0258007 | A1 | 11/2007 | Justiss et al. |
| 2007/0273785 | A1 | 11/2007 | Ogawa et al. |
| 2007/0285526 | A1 | 12/2007 | Mann et al. |
| 2008/0012969 | A1 | 1/2008 | Kasai et al. |
| 2008/0240571 | A1 | 10/2008 | Tian et al. |
| 2009/0046953 | A1 | 2/2009 | Bink et al. |
| 2009/0052780 | A1 | 2/2009 | Kwon et al. |
| 2009/0072120 | A1 | 3/2009 | McGarry et al. |
| 2009/0141987 | A1 | 6/2009 | McGarry et al. |
| 2009/0238478 | A1 | 9/2009 | Banno |
| 2010/0118161 | A1 | 5/2010 | Tsurumi |

FOREIGN PATENT DOCUMENTS

| | | |
|---|---|---|
| EP | 1329846 A1 | 7/2003 |
| EP | 1 580 814 A1 | 9/2005 |
| JP | 1994 06-00466 | 1/1994 |
| JP | 1995 07-25331 | 10/1995 |
| JP | 2005286799 | 10/2005 |
| WO | WO-2005106786 | 11/2005 |
| WO | WO-2007116352 | 10/2007 |

OTHER PUBLICATIONS

R. Forchheimer, et al., "Single-Chip Image Sensors With a Digital Processor Array", Journal of VLSI Signal Processing, 5, Kluwer Academic Publishers, Boston, 1993, pp. 121-131.

Rhee, et al., Boundary Extraction of Moving Objects From Image Sequence, 1999 IEEE Tencon, (1999), 621-624.

Iannizzotto, et al., An Edge-Based Segmentation Technique for 2D Still-Image With Cellular Neural Networks, IEEE Xplore, vol. 1, Publisher: IEEE, (2005), pp. 211-218.

Rehse, Edge Information: A Confidence Based Algorithm Emphasizing Continuous Curves, pp. 851-856.

Miyazak, Image Processing System Having Extended Area of Interest Circuitry, IBM Technical Disclosure Bulletin: Publisher IBM, pp. 447-450, (Mar. 1993).

Sappa, et al., Improving a Genetic Algorithm Segmentation by Means of a Fast Edge Detection Technique, IEEE Xplore, pp. 754-757, (2001).

Chintalapudi, Localized Edge Detection in Sensor Fields, Publisher: University of Southern California (2003).

Rosas, et al., SIMD Architecture for Image Segmentation Using Sobel Operators Implemented in FPGA Technology, 2nd International Conference on Electrical and Electronics Engineering, IEEE, pp. 77-80, (Sep. 2005).

Cat, et al., SIMPiL: An OE Integrated SIMD Architecture for Focal Plane Processing Applications, IEEE Xplore, pp. 44-52, (1996).

Tremblay, et al., "A VLSI Implementation of a Light Sensor With Imbedded Focal Plane Processing Capabilities", "Proceedings of the 1992 IEEE/RSJ INternational Conference on Intelligent Robots and Systems", Jul. 7, 1992, pp. 367-372, Publisher: IEEE, Published in: US.

Broggi, et al., Enhancement of a 2D Array Processor for an Efficient Implementation of Visual Perception Tasks, Proc. Computer Architectures for Machine Perception, Dec. 15, 1993, pp. 172-178, Publisher: IEEE, Published in: US.

Broggi, et al., The Paprica Massively Parallel Processor, First International Conference on, May 2, 1994, pp. 16-30, Publisher: IEEE, Published in: US.

Gregoretti, The Paprica SIMD Array: Critical Reviews and Perspectives, International Conference on, Oct. 25, 1993, pp. 309-319, Publisher: IEEE, Published in: IT.

PCT Search Report, PCT/US2011/036458 (Oct. 19, 2011).

Watanabe, "955-fps Real-time Shape Measurement of a Moving/Deforming Object using High-Speed Vision for Numerous-point Analysis", *2007 IEEE International Conference on Robotics and Automation, Roma, Italy, 10-14* (Apr. 2007).

Ishikawa Oku Laboratory, "Highspeed Vision with Massively Parallel Copressors", *Parallel Processing for Sensory Information—2001—2006 IEEE*, (2001).

Ishikawa Oku Laboratory, "Image-Moment Sensor", *Parallel Processing for Sensory Information, Ishikawa Oku Laboratory, Department of Information Physics and Computing.*, (2008).

Ishikawa Oku Laboratory, "Processor for High-speed Moment-based Analysis of Numerous Objects", *Parallel Processing for Sensory Information, 2001-2006 IEEE, Ishikawa Oku Laboratory, Department of Information Physics and Computing*, (2001).

Ishikawa Oku Laboratory, "Real-time Shape Measurement of Moving/Deforming Object", *Parallel Processing for Sensory Information, 2001-2006 IEEE, Ishikawa Oku Laboratory, Department of Information Physics and Computing*, (2001).

Ishikawa Oku Laboratory, "Vision Chip", *Parallel Processing for Sensory Information, Ishikawa Oku Laboratory, Department of Information Physics and Computing*, (2008).

\* cited by examiner

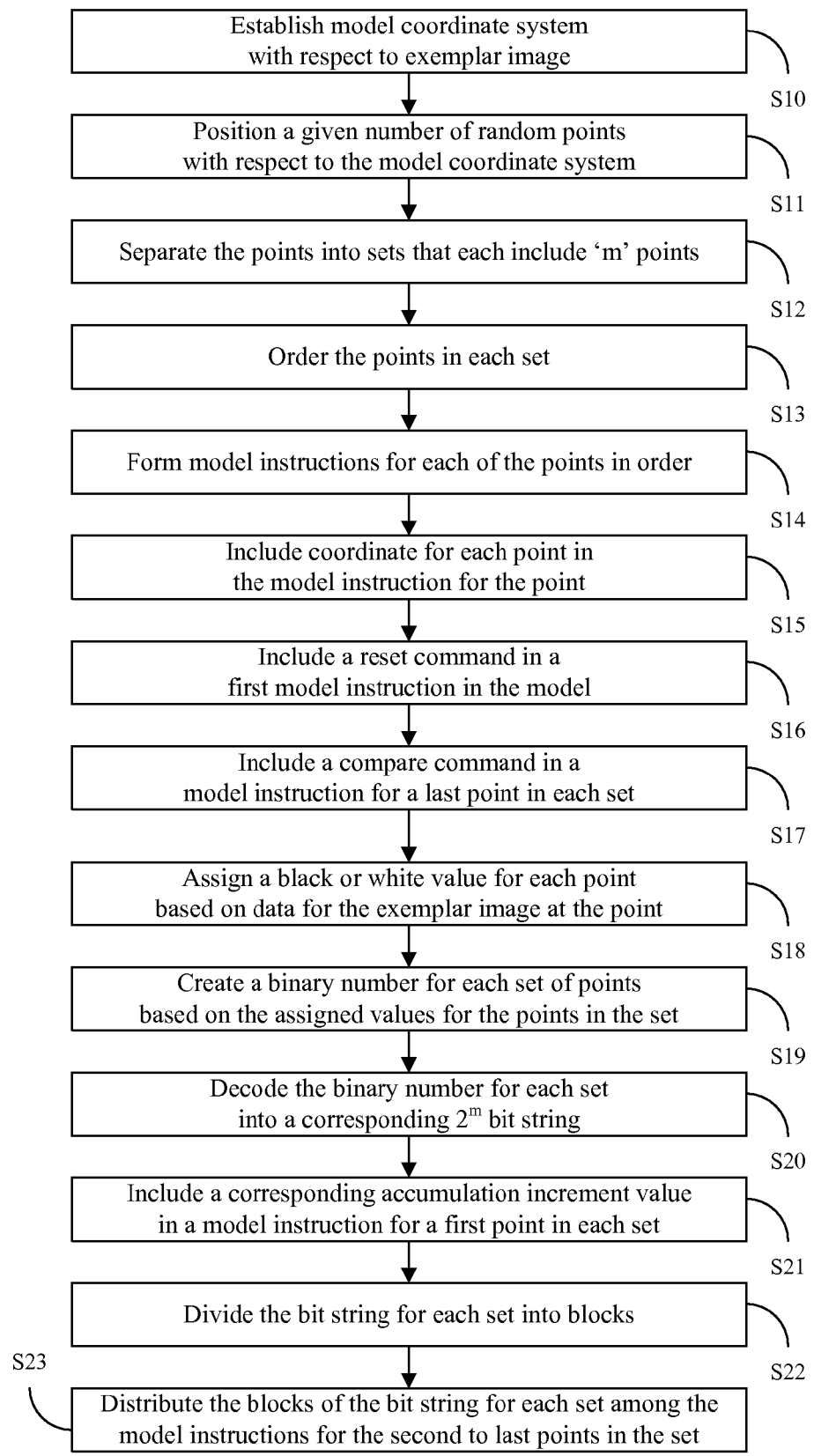

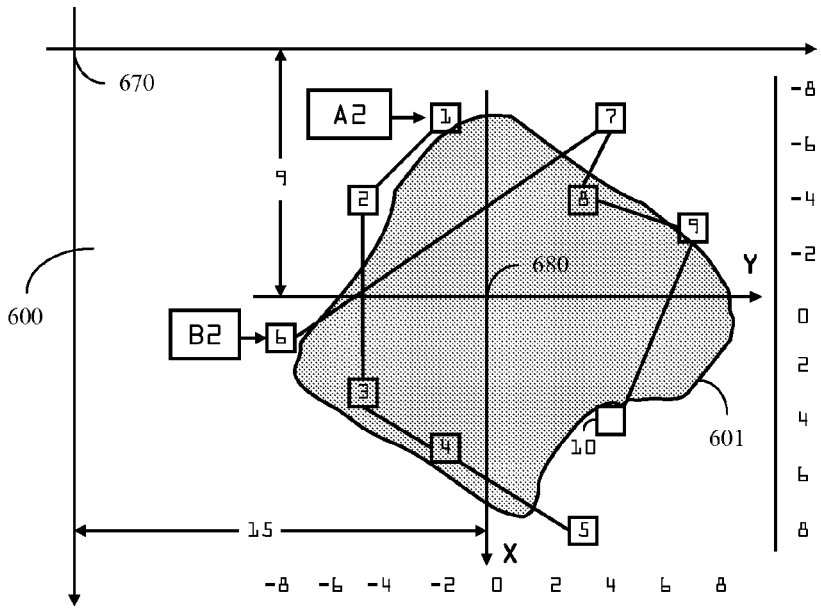
FIG. 7A
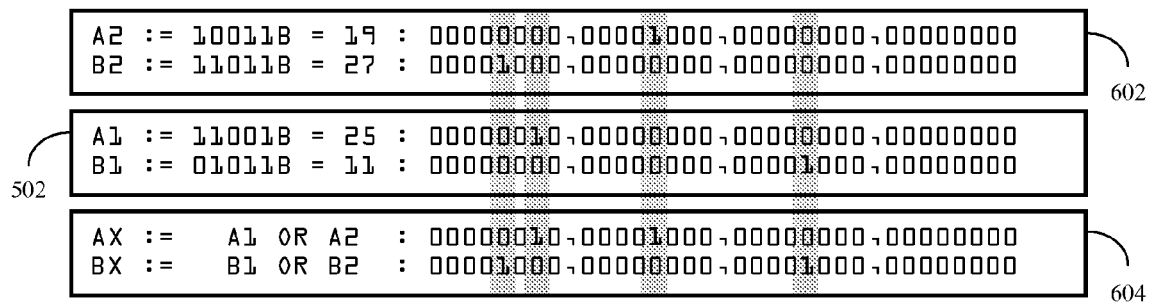
FIG. 7B
| N | X | Y | V | RST | CMP |
|---|---|---|---|---|---|
| 1 | -7 | -2 | 0xXX | 1 | 0 |
| 2 | -4 | -5 | 0x00 | 0 | 0 |
| 3 | 3 | -5 | 0x00 | 0 | 0 |
| 4 | 5 | -2 | 0x08 | 0 | 0 |
| 5 | 8 | 3 | 0x02 | 0 | 1 |
| 6 | 1 | -8 | 0xXX | 0 | 0 |
| 7 | -7 | 4 | 0x00 | 0 | 0 |
| 8 | -4 | 3 | 0x08 | 0 | 0 |
| 9 | -3 | 7 | 0x00 | 0 | 0 |
| 10 | 4 | 4 | 0x08 | 0 | 1 |
FIG. 7C

```
R = X*K00 + Y*K01 + DR
C = X*K10 + Y*K11 + DC
```

VISION SENSORS, SYSTEMS, AND METHODS

CROSS-REFERENCE TO RELATED PATENT APPLICATIONS

This application claims the benefit of U.S. Provisional Patent App. Ser. No. 60/991,545, entitled "Vision System on a Chip", filed Nov. 30, 2007, the entire contents of which are incorporated by reference herein.

BACKGROUND INFORMATION

Embodiments of the present invention relate generally to vision sensors, systems, and methods that allow for image acquisition and processing and, in various embodiments, to vision sensors with pixel circuits and digital processing elements on a single chip.

Vision sensors are generally used in machine vision systems and other systems for obtaining images of physical scenes and processing the images. Such vision sensors typically include a pixel array with photo sensors that each sample light intensity of a corresponding portion of a scene being imaged. Some vision sensors integrate a pixel array and digital processing elements on a single chip to allow for performing some processing of a captured image within the vision sensor chip. However, there is a need for improved vision sensors and algorithms for image processing.

FIG. 1 illustrates a block diagram of a related art single chip vision sensor 100. The vision sensor 100 includes a pixel array 108, a pixel controller 105, a plurality of analog comparators 107, an analog ramp generator 104, a plurality of analog-to-digital converter (ADC) latches 109, and a digital ramp generator 103. The pixel array 108 includes a plurality of pixel circuits 106 that are arranged in rows and columns. Each pixel circuit 106 comprises a light sensitive element, such as a photodiode or the like, to sample light intensity of a corresponding portion of a scene being imaged, and each pixel circuit 106 is configured to provide an analog pixel signal based on the sampled light intensity.

The pixel controller 105 supplies control signals to the pixel circuits 106 in the pixel array 108 to control an operation of the pixel circuits 106. Pixel circuits 106 that are in a same row of the pixel array 108 may share a common row control signal from the pixel controller 105, and pixel circuits 106 that are in a same column of the pixel array 108 may share a common column readout line to provide output. The pixel controller 105 typically controls the pixel circuits 106 to provide output row by row. The analog pixel signals output from each column of pixel circuits 106 in the pixel array 108 are input to a corresponding analog comparator 107.

Analog-to-digital conversion of the analog pixel signals output from the pixel array 108 is performed using the plurality of analog comparators 107, the analog ramp generator 104, the plurality of ADC latches 109, and the digital ramp generator 103. Analog pixel signals output at each column of the pixel array 108 are compared, in the corresponding analog comparator 107, to a common analog reference level generated by the analog ramp generator 104. The digital ramp generator 103 produces a digital signal that is representative of the analog reference level generated by the analog ramp generator 104. When, on any given column, the analog reference level equals a level of the analog pixel signal, the corresponding analog comparator 107 generates a digital output that causes a corresponding ADC latch 109 to latch a value of the digital signal supplied by the digital ramp generator 103.

The vision sensor 100 further includes a control processor 101, a general purpose memory 102, a plurality of image input registers 110, a plurality of input/output (I/O) registers 111, a plurality of shift registers 112, a plurality of arithmetic logic units (ALUs) 113, a plurality of image memory devices 114, and a plurality of digital image buses 118. Control processor 101 is connected to the general purpose memory 102, from which it obtains programs to execute to control elements of the vision sensor 100. Each ADC latch 109 is connected to a corresponding image input register 110, and each image input register 110 is connected, by output data lines, to a corresponding digital image bus 118.

Each digital image bus 118 may be a serial bus that carries data in bit-serial form. Each digital image bus 118 is connected to a corresponding image input register 110, a corresponding I/O register 111, a corresponding shift register 112, a corresponding ALU 113, and a corresponding image memory device 114. The plurality of I/O registers 111 are each connected to the control processor 101 for inputting data from and outputting data to the control processor 101. The plurality of shift registers 112 are each connected to their immediate neighbors on the left and right, if present. Each ALU 113 is connected to the corresponding digital image bus 118 through a set of corresponding registers, which include at least two data input registers (a and b), and a carry register (c).

Each image input register 110 makes digitized image data available, by way of the corresponding digital image bus 118, to the corresponding I/O register 111, the corresponding shift register 112, the corresponding ALU 113, and the corresponding image memory device 114. In a typical processing operation, image data is buffered in the plurality of image memory devices 114 and processed using the plurality of ALUs 113. The processed image data may then be accessed by the control processor 101 though the plurality of I/O registers 111 for secondary data processing and external communication of the processed image data with external devices.

As a practical matter, the capabilities of the vision sensor 100 favor relatively simple filtering operations that characterize early stages of machine vision processing. When applied to more complex algorithms, the computational efficiency that can be derived from the digital processing elements of the vision sensor 100 is highly restricted by communications between the elements and by the simplistic nature of the arithmetic logic units 113. Therefore, there is a need for improved vision sensors for image processing.

SUMMARY OF THE DISCLOSURE

Embodiments of the present invention relate generally to vision sensors, systems, and methods that allow for image acquisition and processing and, in various embodiments, to vision sensors with pixel circuits and digital processing elements on a single chip. In various embodiments, a Vision System on a Chip (VSoC) comprises a vision sensor with pixel circuits and digital processing elements on a single chip. In various embodiments, digital processing elements of a vision sensor are configured to perform pattern matching to identify locations of interest in an image. In some embodiments, a vision sensor is configured to obtain image data for an image based on sensed light, and to identify some or all transformations of a model of a feature that result in the model being maximally correlated with the image.

A single chip vision sensor in accordance with an embodiment of the present invention includes a pixel array and one or more circuits. In various embodiments, the one or more circuits are configured to search an image for one or more features using a model of the one or more features. Also, in various embodiments, the one or more circuits are configured to process one or more signals provided from the pixel array to generate the image. In some embodiments, the model includes a plurality of model instructions that each include a corresponding coordinate with respect to a model reference point. In various embodiments, the one or more circuits are configured to record one or more poses of a model relative to the image that result in at least a partial match between the model and the image. Also, in various embodiments, the one or more poses are each related to a corresponding row of the image, a corresponding column of the image, a corresponding angle of rotation, and a corresponding scale value.

In some embodiments, the one or more circuits are configured to transform one or more coordinates of the model in accordance with one or more affine transform values. In some embodiments, the one or more circuits are configured to transform one or more coordinates of the model in accordance with one or more transform values that specify a rotation, a scale, and/or a translation of the model. In various embodiments, the one or more circuits are configured to compare the model, after transforming one or more coordinates of the model, with the image for each of a plurality of positionings of the model relative to the image concurrently. Also, in various embodiments, the plurality of positionings include positionings of a reference point of the model at a plurality of locations in a row of the image. Thus, in various embodiments, a geometrically transformed model can be compared with the image for a plurality of locations of the geometrically transformed model with respect to the image concurrently. In some embodiments, the one or more circuits are configured to store information relating to certain poses of the model based on results of comparisons performed using the model.

In some embodiments, the one or more circuits include an image address processor that is configured to transform coordinates of the model into transformed coordinates based at least partially on one or more transform values. Also, in some embodiments, the one or more circuits further include a plurality of image memory devices for storing image data of the image and for outputting data concurrently with each other in a case where the plurality of image memory devices are accessed using at least one of the transformed coordinates. In some embodiments, the one or more circuits further include an image data selector that is configured to receive data of the image and to shift the data by an amount that is based on at least one of the transformed coordinates.

In various embodiments, the one or more circuits include a plurality of comparators for comparing, concurrently with each other, one or more corresponding values obtained based on data of the image with one or more values of the model. Also, in various embodiments, the one or more circuits further include a plurality of accumulators, where each accumulator of the plurality of accumulators is configured to receive an accumulation increment of the model and to selectively perform accumulation to accumulate the accumulation increment based on an output of a corresponding comparator of the plurality of comparators. In some embodiments, the one or more circuits further include a model data shifter for shifting the one or more values and the accumulation increment of the model within the model data shifter and for providing the one or more values to the plurality of comparators and the accumulation increment to the plurality of accumulators. In various embodiments, the one or more circuits include a priority encoder for indicating positionings of the model in accordance with a binary tag word that is formed based on results of comparisons of the model, after one or more coordinates of the model have been transformed, with the image.

A method in accordance with an embodiment in a single chip vision sensor includes obtaining an image based at least partially on sensed light, and searching the image for one or more features using a model of the one or more features. In some embodiments, the model includes a plurality of model instructions that each include a corresponding coordinate with respect to a model reference point. In various embodiments, the searching includes recording one or more poses of a model relative to the image that are determined based on results of comparisons using at least a portion of the model. In various embodiments, the obtaining includes processing signals provided based on the sensed light to generate the image. In some embodiments, the method includes comparing the model, after transforming one or more coordinates of the model, with the image for each of a plurality of positionings of the model relative to the image concurrently. Also, in some embodiments, the plurality of positionings include positionings of a reference point of the model at a plurality of locations in a row of the image.

In various embodiments, the method includes transforming coordinates of the model into transformed coordinates based on one or more transform values. In some embodiments, the method includes causing a plurality of image memory devices to output data concurrently with each other by accessing the plurality of image memory devices using at least one of the transformed coordinates. Also, in some embodiments, the method includes shifting data of the image by an amount that is based on at least one of the transformed coordinates. In various embodiments, the method includes causing a plurality of comparators to compare, concurrently with each other, one or more corresponding values obtained based on data of the image with one or more values of the model. Also, in various embodiments, the method includes selectively performing accumulation to accumulate an accumulation increment in an accumulator based on an output of a corresponding comparator of the plurality of comparators. In some embodiments, the method includes outputting information related to a result of the searching.

A system in accordance with an embodiment of the present invention includes a single chip vision sensor and a device. In various embodiments, the single chip vision sensor is configured to obtain an image based at least partially on sensed light and to search the image for one or more features using a model of the one or more features. Also, in various embodiments, the device is configured to receive one or more signals from the single chip vision sensor and to control an operation based at least partially on the one or more signals. In some embodiments, the one or more signals are control signals. In some embodiments, the one or more signals specify data or information. In various embodiments, the device controls an operation by controlling another device. In some embodiments, the single chip vision sensor provides control signals to the device and the device controls an operation by performing an operation based on the control signals.

BRIEF DESCRIPTION OF THE DRAWINGS

FIG. 5 illustrates a flowchart of a method in accordance with an embodiment of the present invention for creating a model of a feature from an exemplar image;

FIG. 7A illustrates an example in accordance with an embodiment of the present invention of positioning a coordinate system and points on an exemplar image;

FIG. 7B illustrates an example in accordance with an embodiment of the present invention of forming bit strings for more than one feature;

FIG. 7C illustrates an example of model instructions for a model of more than one feature in accordance with an embodiment of the present invention;

DETAILED DESCRIPTION OF ILLUSTRATIVE EMBODIMENTS

Figure 1:
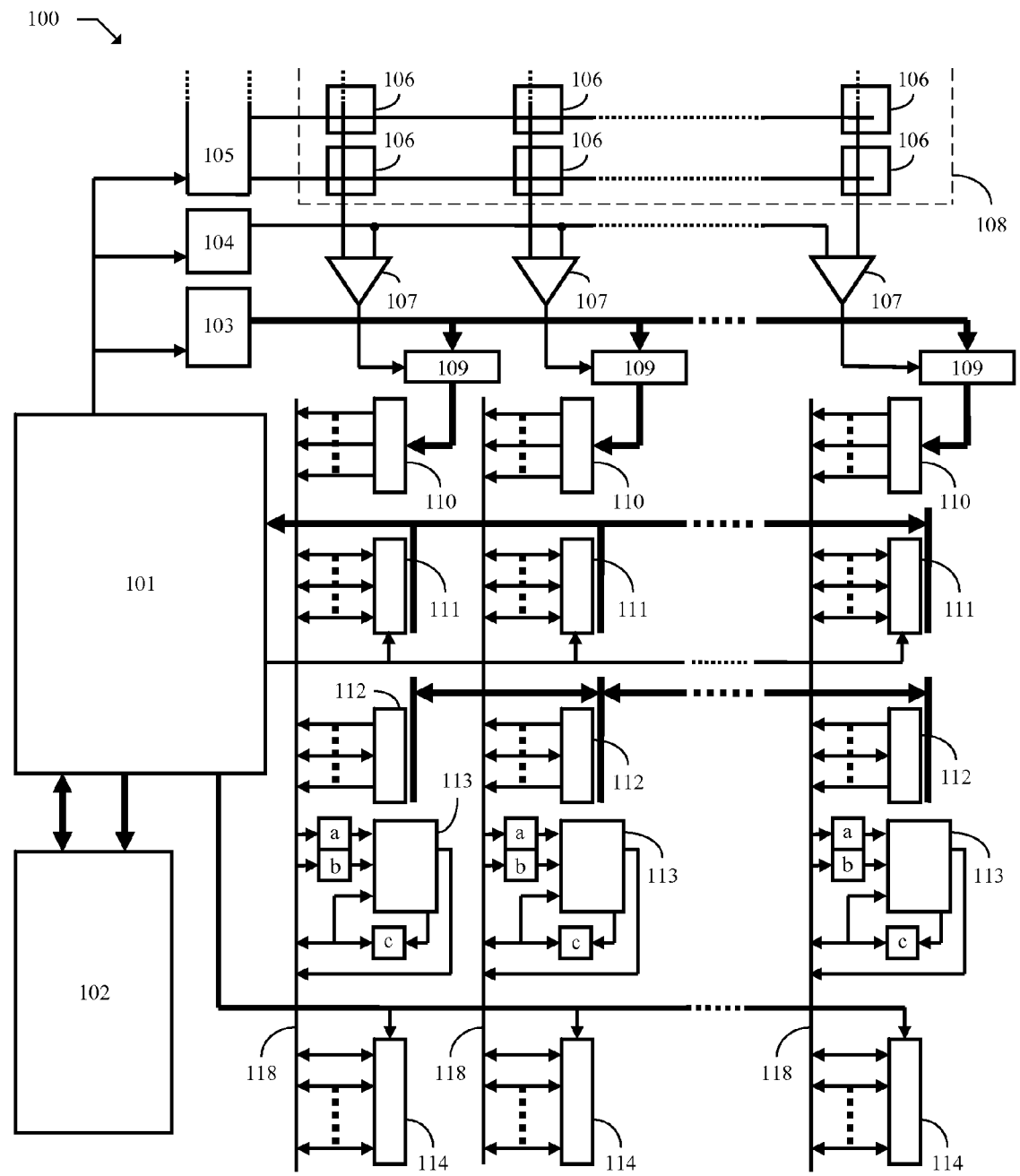
FIG. 1 illustrates a block diagram of a related art vision sensor.
Figure 2:
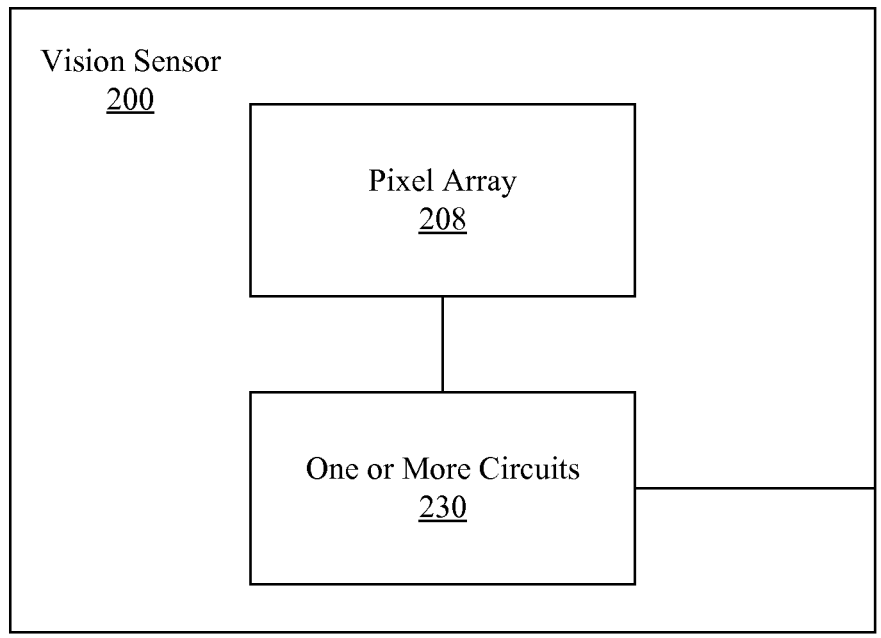
FIG. 2 illustrates a block diagram of a vision sensor in accordance with an embodiment of the present invention.

FIG. 2 illustrates a block diagram of a single chip vision sensor 200 in accordance with an embodiment of the present invention. The vision sensor 200 includes a pixel array 208 and one or more circuits 230 on a single chip. In various embodiments, the pixel array 208 is configured to provide pixel signals to the one or more circuits 230 based on sensed light for a scene being imaged. Also, in various embodiments, the one or more circuits 230 are configured to process the pixel signals provided from the pixel array 208 to form an image, and optionally are configured to perform pattern matching with respect to the image. In various embodiments, the pixel array 208 and the one or more circuits 230 form a single integrated circuit on a substrate of semiconductor material. Also, in various embodiments, the vision sensor 200 includes one or more I/O pins (not shown) for inputting data to and outputting data from the vision sensor 200.

The vision sensor 200 may be employed in various applications, such as machine vision applications, consumer applications, or the like. In various embodiments, the vision sensor 200 may be employed in applications in which there is a need for one or more of (i) image acquisition; (ii) image pre-processing; and (iii) pattern matching. In various embodiments, the vision sensor 200 allows for performing image acquisition, image pre-processing, and/or pattern matching in a single chip or integrated circuit.

Figure 3:
FIG. 3 illustrates a block diagram of a system in accordance with an embodiment of the present invention.

FIG. 3 illustrates a block diagram of a system 270 in accordance with an embodiment of the present invention. The system 270 includes the vision sensor 200 and a device 240. In the system 270, the vision sensor 200 is in communication with the device 240 for transmitting signals to the device 240. In some embodiments, the signals are control signals. In some embodiments, the signals specify data or information. In some embodiments, the vision sensor 200 is also in communication with the device 240 for receiving signals from the device 240. In various embodiments, the device 240 allows for affecting or influencing the physical world. In some embodiments, the device 240 is configured to control or perform an operation based at least partially on one or more signals received from the vision sensor 200.

In some embodiments, the device 240 is configured to control another device or apparatus (not shown) based on data received from the vision sensor 200. In various embodiments the device 240 is controllable and the vision sensor 200 is configured to send control signals to the device 240 to control the device 240. Examples of types of devices that may be used as the device 240 include, but are not limited to, a display device, a communication device, a computing device, a robotic arm, a switch, a vehicle control device, a product assembly device, an inspection device, a surveillance device, a medical device, or the like.

In various embodiments, the vision sensor 200 is configured to acquire an image, and to perform processing on the image, and to provide data to the device 240 based on a result of the processing. For example, in various embodiments, the vision sensor 200 is configured to search for one or more features in an image based on one or more models of the one or more features, and to output data to the device 240 based on a result of the search. By allowing for performing both image acquisition to acquire an image and pattern matching to search for features in an image on a single chip or integrated circuit, an amount of data transmitted from the vision sensor 200 may be reduced as compared to a case in which image data must be transmitted from the vision sensor 200 to a separate processor external to the vision sensor 200 for performing pattern matching by the separate processor.

For example, in various embodiments, the vision sensor 200 may be employed to obtain images, search the images for one or more features using a model of the one or more features, and then provide a trigger signal to the device 240 in cases where the one or more features are found in an image. Also, in some embodiments, the vision sensor 200 may be employed to obtain images, search the images for one or more features using a model of the one or more features, and then provide location data indicating locations of the one or more features in a physical scene to the device 240 in cases where the one or more features are found in an image. As a consequence, in such embodiments, rather than transmitting entire image data from the vision sensor 200 to a separate external processor to have the separate external processor perform a search for features, the vision sensor 200 may perform the search on the vision sensor chip and then only needs to send a trigger signal, location data, or the like, to the device 240, which allows for reducing an amount of data that needs to be transmitted from the vision sensor 200.

In various embodiments, the vision sensor 200 is configured to acquire an image, and to perform processing on the image, and to control the device 240 based on a result of the processing. For example, in various embodiments, the vision sensor 200 is configured to search for one or more features in an image based on one or more models of the one or more features, and to control an operation of the device 240 based on results of the search. As a consequence, in such embodiments, rather than transmitting entire image data from the vision sensor 200 to a separate external processor to have the separate external processor perform a search for features, the vision sensor 200 may perform the search on the vision sensor chip and then only needs to send control signals, control instructions, or the like, to the device 240, which allows for reducing an amount of data that needs to be transmitted from the vision sensor 200.

In various embodiments, reducing an amount of data that needs to be transmitted from the vision sensor 200 allows for increasing a speed, in frames per second, at which the vision sensor 200 is able to acquire images, because the vision sensor 200 does not have to wait as long for output transmissions to complete. For example, in some embodiments, the vision sensor 200 may be configured to capture and process images at a rate greater than 200 frames per second, which could allow the vision sensor 200 to be advantageously used for applications such as automated video surveillance, vehicle control, triggering for identification (ID) readers, gesture recognition, dimensioning of objects through three-dimensional (3D) modeling using a static or moving vision sensor, motion analysis, or the like.

In various embodiments, the vision sensor 200 may be configured to self trigger so that, in various embodiments, the vision sensor 200 can always be on and acquiring images. In various embodiments, the vision sensor 200 may be configured to provide a trigger to be used as a software trigger for other vision applications, such as a software trigger for ID readers. Various embodiments of the vision sensor 200 may be used in, or supplement, other vision systems, including, for example, systems described in the following references: (i) U.S. patent application Ser. No. 10/865,155, entitled "Method and Apparatus for Visual Detection and Inspection of Objects"; and (ii) U.S. patent application Ser. No. 11/763,752, entitled "Method and System for Optoelectronic Detection and Location of Objects", the entire contents of both of which are incorporated by reference herein.

Reducing an amount of data that needs to be transmitted off a chip of the vision sensor 200 also allows for lower power dissipation, since less current is needed to drive signals off the chip, and also allows for generating less electromagnetic interference (EMI) due a reduced amount of exchanged data between the vision sensor 200 and external devices. Reducing power dissipation has advantages in many applications, such as battery limited applications, medical applications, military applications, vehicle applications, or the like. For example, in various embodiments, the vision sensor 200 may be used as a sensor to replace an eye for a blind person, in which low power dissipation and fast processing are advantageous. Similarly, reducing EMI has advantages in many applications, such as vehicle control applications, military applications, or the like, where EMI can interfere with an operation of other equipment.

In some embodiments, the device 240 is a type of device that is capable of processing image data and the vision sensor 200 is configured to transmit image data to the device 240. In some embodiments in which the vision sensor 200 is configured to transmit image data to the device 240, the vision sensor 200 is configured to search an image for one or more features using a model of the one or more features, and to transmit image data of the image to the device 240 only if at least one of the one or more features are found in the image. Also, in some embodiments in which the vision sensor 200 is configured to transmit image data to the device 240, the vision sensor 200 is configured to search an image for one or more features using a model of the one or more features, and to transmit to the device 240 only image data for regions of interest in the image that are determined based on identified features from the search. In various embodiments in which the vision sensor 200 is configured to transmit image data to the device 240, the vision sensor 200 may be controllable to send entire image data for images to the device 240. In some embodiments, the vision sensor 200 is configured to transmit pose information to the device 240 that indicates poses of a model relative to an image for which one or more features have been detected.

In various embodiments, the device 240 may comprise a processor (not shown) and the vision sensor 200 may be configured to interactively exchange processing tasks with the processor of the device 240 and/or to allow a user to specify which specific tasks are to be performed by each of the vision sensor 200 and the processor of the device 240, so as to allow, for example, for optimization of throughput, use of memory, or the like. Also, in various embodiments, the device 240 may comprise a processor (not shown) and the vision sensor 200 may be configured to determine candidate images or portions of images that may contain one or more features and then transfer the candidate images or portions of images to the device 240 for further processing by the device 240. In some embodiments, the vision sensor 200 may be used with one or more other pieces of equipment (not shown), such as auto-focusing optics, adaptive equipment, or the like, to provide different depths of field or different illumination, for example, while acquiring images and optionally processing them, within a useful time period for various applications, such as ID applications, or the like.

Figure 4:
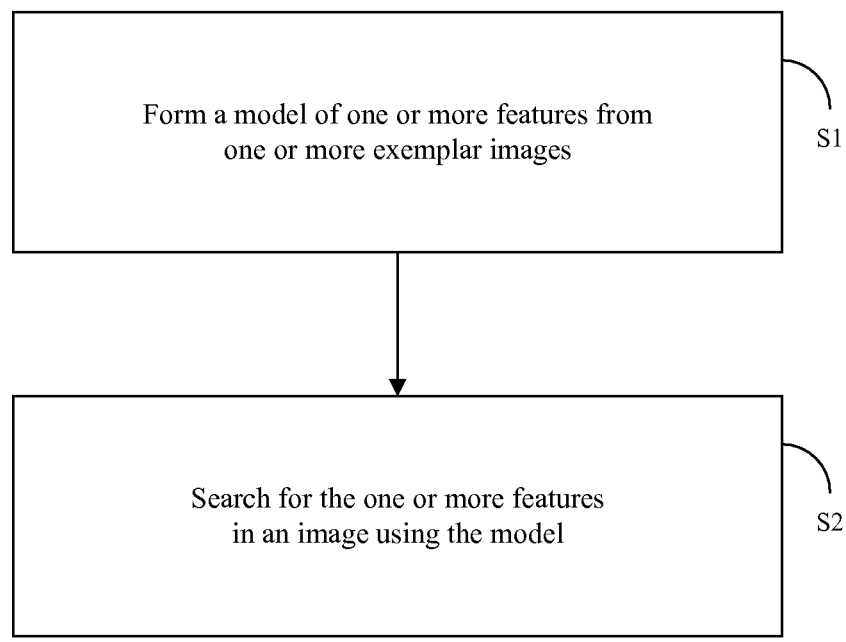
FIG. 4 illustrates a flowchart of a method in accordance with an embodiment of the present invention.

FIG. 4 illustrates a flowchart of a method in accordance with an embodiment of the present invention. In S1, a model of one or more features is formed from one or more exemplar images. In various embodiments, a model of one or more features is a simplified representation of the one or more features. In some embodiments, rather than forming a model from one or more exemplar images, a model of one or more features may be formed in any other suitable manner, such as, for example, from computer-aided design (CAD) data for the one or more features. With reference to FIGS. 3 and 4, in some embodiments the device 240 comprises a computing device, or the like, that is configured to form a model of one or more features from one or more exemplar images and is configured to send the model to the vision sensor 200. In some embodiments, the vision sensor 200 is configured to form a model of one or more features from one or more exemplar images. In various embodiments, a model of one or more features may be formed from one or more exemplar images by any suitable device and then downloaded to the vision sensor 200. In some embodiments, the model includes a plurality of model instructions that each include a coordinate that is specified with respect to a reference point of the model. Also, in some embodiments, the model includes one or more values obtained based on one or more exemplar images. After the model has been formed, the method continues to S2.

In S2, the vision sensor 200 searches for the one or more features in an image using the model. In various embodiments, the vision sensor 200 is configured to obtain an image by sensing light and performing processing based on the sensed light to provide the image. Also, in various embodiments, the vision sensor 200 is configured to search for the one or more features in the image obtained by the vision sensor 200. Thus, in various embodiments, the vision sensor 200 allows for obtaining an image and for searching for one or more features in the image using a model of the one or more features.

FIG. 5 illustrates a flowchart of a method in accordance with an embodiment of the present invention for forming a model of a feature from an exemplar image. In various embodiments, the method of FIG. 5 may be used in step S1 of the method of FIG. 4 to form a model. In some embodiments, a computer-readable storage medium (not shown) stores a program that when executed on a computing device causes the computing device to perform the method of FIG. 5 to form a model. In such embodiments, the model may then be transmitted to a vision sensor, such as the vision sensor 200 of FIG. 2. In some embodiments, the vision sensor 200 is configured to perform the method of FIG. 5 to form a model. Of course, it should be understood that the method of FIG. 5 is merely an example of a method for forming a model in accordance with an embodiment of the present invention, and that, in various other embodiments, other suitable methods may be employed to form other suitable models of features from exemplar images.

Figures 6A, 6B, 6C:
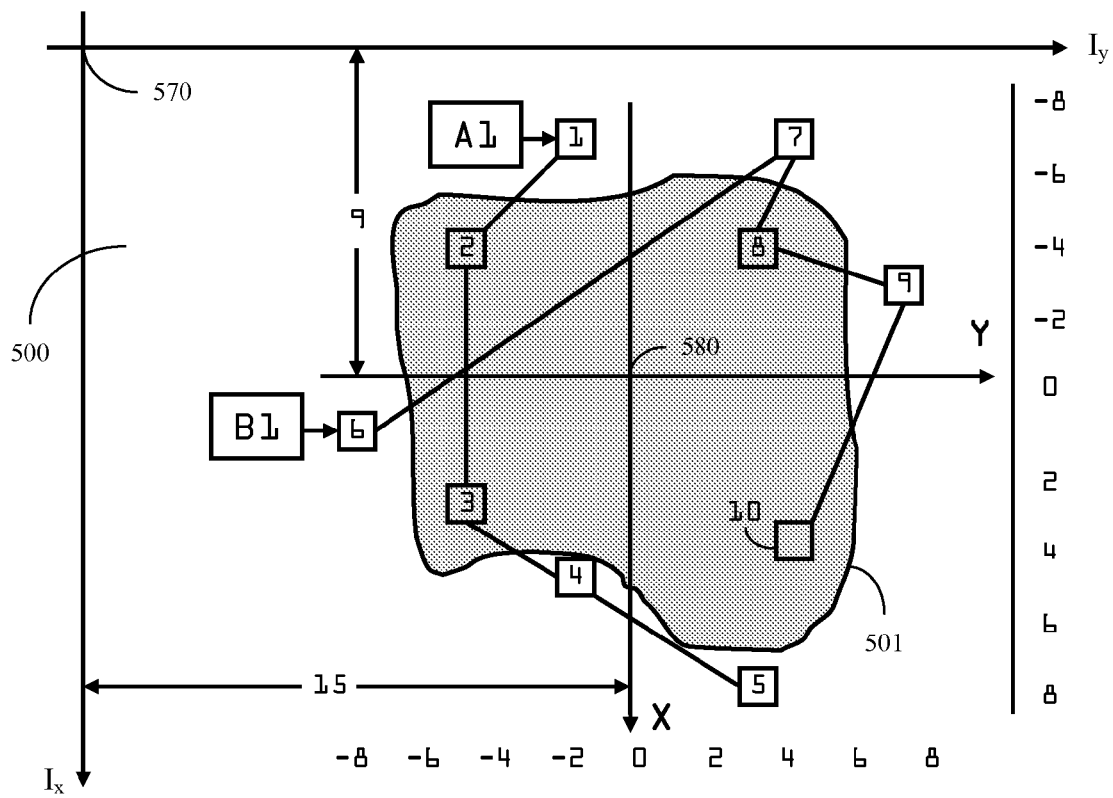
FIG. 6A illustrates an example in accordance with an embodiment of the present invention of positioning a coordinate system and positioning random points on an exemplar image.
FIG. 6B illustrates an example in accordance with an embodiment of the present invention of creating binary numbers for sets of points and decoding the binary numbers.
FIG. 6C illustrates an example of model instructions for a model of a feature in accordance with an embodiment of the present invention.

In various embodiments of the method in FIG. 5, an exemplar image may be obtained from any source. FIG. 6A illustrates an example in accordance with an embodiment of the present invention to aid in understanding of the method of FIG. 5. In FIG. 6A, a example of an exemplar image 500 is illustrated, and the exemplar image 500 can be addressed by a rectangular coordinate pair of (row, column) with respect to a coordinate system for the exemplar image 500 centered at reference point 570 and illustrated by row axis $I_x$ and column axis $I_y$. Contained within the exemplar image 500, there exists a feature 501, which may represent, for example, an object in a scene, or the like. It should be appreciated that the feature 501 is merely provided as an example feature, and that features of varying shapes and sizes, and features including one or more shapes or elements, may be contained in exemplar images.

With reference to FIGS. 5 and 6A, in S10 a model coordinate system is established with respect to an exemplar image. For example, in the example of FIG. 6A, a model reference point 580 is chosen for the feature 501 in the exemplar image 500, and a model coordinate system specified by a row axis X and a column axis Y centered at the model reference point 580 is established for the feature 501. The method then continues to S11. In S11, a given number of points are positioned with respect to the model coordinate system and, in various embodiments, the points may be positioned at random positions with respect to the model coordinate system. For example, in the example of FIG. 6A, ten points labeled 1 through 10 in the figure, respectively, are positioned with respect to the model reference point 580 of the model coordinate system. It should be appreciated that a different number of points may be used, and that 10 points are merely provided as an example. The method of FIG. 5 then continues to S12.

In S12, the points are separated into sets that each include m points, where m is an integer value. For example, in the example of FIG. 6A, the 10 points are separated into two sets, A1 and B1, that each include 5 points. It should be appreciated that two sets are merely provided as an example and that, in various embodiments, there may be any desired number of sets of points. In some embodiments, there may be more than 100 sets of points for a model. In the example, set A1 includes points 1-5, and set B1 includes points 6-10. The method then continues to S13. In S13, the points in each set are ordered. For example, in the example of FIG. 6A, the points in set A1 are ordered 1 though 5, and the points in the set A2 are ordered 6 through 10. The method then continues to S14.

In S14, model instructions for the model are formed for each of the points in order. FIG. 6C illustrates an example of a model 503 for the feature 501 of FIG. 6A, and the model 503 includes a plurality of model instructions. With reference to the example of FIGS. 6A and 6C, the model 503 includes a model instruction for each point 1-10. The column labeled N in the model 503 includes the instruction number for each model instruction, and the model instructions are in a same order as an order of the points 1-10. With reference again to FIG. 5, the method then continues to S15. In S15, coordinates for each point in the model coordinate system are included in the model instruction for the point. For example, in the example of FIGS. 6A and 6C, the columns labeled X and Y in the model 503 include the coordinates for each point in the model instruction for the point. Thus, for example, the model instruction for point 1 has the coordinates (−7, −2), which are the coordinates for point 1 with respect to the model coordinate system. Also, for example, the model instruction for point 2 has the coordinates (−4, −5), which are the coordinates for point 2 with respect to the model coordinate system. The method then continues to S16.

In S16, a reset command is included in a first instruction in the model. For example, in the example of FIG. 6C, a bit with value "1" is provided in the column labeled RST for the first model instruction in the model 503. The second to last model instructions in the model 503 include a bit with a value "0" in the column labeled RST. In various embodiments, the reset command in a model is for indicating to one or more accumulators that the one or more accumulators should be reset to a default value in preparation for an execution of the model. With reference to FIG. 5, the method then continues to S17. In S17, a compare command is included in a model instruction for a last point in each set of points. For example, in the example of FIGS. 6A and 6C, the fifth model instruction, which is for a last point in set A1, includes a bit with value "1" in the column labeled CMP in the model 503. Similarly, the tenth model instruction, which is for a last point in set B1, includes a bit with value "1" in the column labeled CMP in the model 503. The other model instructions in the model 503 include a bit with a value of "0" in the column labeled CMP. In various embodiments, a compare command in a model is for indicating to one or more comparators that the one or more comparators should perform a compare operation.

With reference to FIG. 5, the method then continues to S18. In S18, a black value or a white value is assigned for each point based on data for the exemplar image at the point.

In various embodiments, the exemplar image is a binary image, and the black or white value for each point is assigned based on whether the exemplar image is black or white at the point. In various other embodiments, the exemplar image is a grayscale image or color image, and the black or white value for each point is assigned based on a comparison of a value of the exemplar image at the point with a threshold value. In the example of FIG. 6A, the exemplar image 500 is a binary image. Also, in the example of FIG. 6A, it is assumed that a black value is "0", and a white value is "1". Thus, in the example of FIG. 6A, points 1, 4, 5, 6, 7, and 9, are assigned a value of "1" as being in white portions of the exemplar image 500, and points 2, 3, 8, and 10, are assigned a value of "0" as being in black portions of the exemplar image 500. The method then continues to S19.

In S19, a binary number is created for each set of points based on the assigned black or white values for the points in the set. FIG. 6B illustrates a text box 502 with example binary numbers created for the sets A1 and B1 based on the assigned black or white values for the points in those sets. In the example of FIG. 6B, the binary number created for the set A1 is "11001", and the binary number created for the set B1 is "01011". It should be noted that, in the example of FIG. 6B, the binary number for each set is formed from the points in the set starting with the least significant bit in the binary number for the first point in the set and moving toward the most significant bit in the binary number for the last point in the set. Thus, the binary number "11001" for set A1 indicates that point 5 is associated with a value of "1", point 4 is associated with a value of "1", point 3 is associated with a value of "0", point 2 is associated with a value of "0", and point 1 is associated with a value of "1". The method then continues to S20.

In S20, the binary number for each set is decoded into a corresponding $2^m$ bit string. For example, in the example of FIG. 6B, the binary number "11001" for set A1, which corresponds to the decimal number 25 is decoded into the bit string "0 0 0 0 0 1 0 0 0 0 0 0 0 0 0 0 0 0 0 0 0 0 0 0 0 0 0 0 0 0 0 0", where a value of "1" is placed in the position for bit 25 given that the lowest order bit is bit position 0. Similarly, in the example of FIG. 6B, the binary number "01011" for set B1, which corresponds to the decimal number 11 is decoded into the bit string "0 0 0 0 0 0 0 0 0 0 0 0 0 0 0 0 0 0 0 0 1 0 0 0 0 0 0 0 0 0 0 0", where a value of "1" is placed in the position for bit 11 given that the lowest order bit is bit position 0. It should be noted that in the example of FIG. 6B, the value of m is 5, so each set having 5 points can have 2 raised to the power of 5 or 32 possible states depending on the content of the exemplar image. It should also be appreciated that m may be set to different values in other instances, and that 5 is merely provided as an example.

With reference to FIG. 5, the method then continues to S21. In S21, a corresponding accumulation increment value is included in a model instruction for a first point in each set of points. For example, in the example of FIG. 6C, the first model instruction in the model 503, which is a model instruction for a first point in the set A1, has a corresponding accumulation increment as indicated by the hexadecimal value "0xXX" in column V of the model 503, where "XX" indicates that the accumulation increment can be set to any specified value. Similarly, the sixth model instruction in the model 503, which is a model instruction for a first point in the set B1, has a corresponding accumulation increment as indicated by the hexadecimal value "0xXX" in column V of the model 503, where "XX" indicates that the accumulation increment can be set to any specified value. The method then continues to S22.

In S22, the bit string for each set of points is divided into blocks. For example, in the example of FIG. 6B, the bit string for the set A1 is divided into the four blocks of "0 0 0 0 0 1 0", "0 0 0 0 0 0 0 0", "0 0 0 0 0 0 0 0", and "0 0 0 0 0 0 0 0", which represent the hexadecimal numbers of "0x02", "0x00", "0x00", and "0x00", respectively. Similarly, in the example of FIG. 6B, the bit string for the set B1 is divided into the four blocks of "0 0 0 0 0 0 0 0", "0 0 0 0 0 0 0 0", "0 0 0 0 1 0 0 0", and "0 0 0 0 0 0 0 0", which represent the hexadecimal numbers of "0x00", "0x00", "0x8", and "0x00", respectively. With reference to FIG. 5, the method then continues to S23.

In S23, the blocks of the bit string for each set of points are distributed among the model instructions for the second to last points in the set. For example, in the example of FIGS. 6B and 6C, the blocks of the bit string for set A1 are distributed across the second to fifth model instructions in column V of the model 503. It should be noted that in the example of FIG. 6C, the blocks are distributed across the instructions beginning with the block for the least significant bits of the bit string and proceeding toward the block with the most significant bits of the bit string. Similarly, in the example of FIGS. 6B and 6C, the blocks of the bit string for set B1 are distributed across the seventh to tenth model instructions in column V of the model 503.

Thus, in accordance with the method specified by the flowchart of FIG. 5, a model may be created for a feature in an exemplar image. In various embodiments, a model created from one or more exemplar images may be termed a "trained model", since the model is learned from data of the one or more exemplar images. Of course, it should be appreciated that models created according to the method of FIG. 5 are merely one type of model and that, in various other embodiments, different types of models that provide representations of features may be created. For example, in various embodiments, multiple bit planes of an image may be obtained, and a model may be created from the multiple bit planes of the image. In some such embodiments, an additional bit plane value may be used for specifying each point in a model, where the additional bit plane value for a point specifies a bit plane of the point.

In various embodiments, a model may represent more than one feature from more than one exemplar image. FIG. 7A illustrates an example of an exemplar image 600 with a feature 601. FIG. 7C illustrates an example of a model 605 of both the feature 601 from the exemplar image 600 of FIG. 7A and the feature 501 from the exemplar image 500 of FIG. 6A. In the exemplar image 600 of FIG. 7A, the feature 601 differs from the feature 501 of the exemplar image 500 of FIG. 6A, but a model reference point 680 is established with respect to a reference point 670 of the exemplar image 600 and points 1-10 are positioned at the same coordinates with respect to the model reference point 680 as they are to the model reference point 580. Then, in the example of FIG. 7A, the points are divided into the sets A2 and B2 in the same way that they were divided into sets A1 and B1 in FIG. 6A.

FIG. 7B illustrates (i) a text box 602 with values associated with the sets A2 and B2 from FIG. 7A; (ii) the text box 502 from FIG. 6B; and (iii) a text box 604 with values AX and BX. The values in text box 602 are obtained by applying steps S18-S20 of the method of FIG. 5 to the points in FIG. 7A. In the example of FIG. 7B in the text box 602, the binary number created for the set A2 is "10011", and the binary number created for the set B2 is "11011". It should be noted that, in the example of FIG. 7B, the binary number for each set is formed from the points in the set starting with the least significant bit in the binary number for the first point in the set and moving toward the most significant bit in the binary number for the last point in the set. Thus, the binary number "10011" for set A2 indicates that point 5 is associated with a white value of "1", point 4 is associated with a black value of "0", point 3 is associated with a black value of "0", point 2 is associated with a white value of "1", and point 1 is associated with a white value of "1".

In the example of FIG. 7B in the text box 602, the binary number "10011" for set A2, which corresponds to the decimal number 19 is decoded into the bit string "0 0 0 0 0 0 0 0 0 0 0 0 1 0 0 0 0 0 0 0 0 0 0 0 0 0 0 0 0 0 0", where a value of "1" is placed in the position for bit 19 given that the lowest order bit is bit position 0. Similarly, in the example of FIG. 7B, the binary number "11011" for set B2, which corresponds to the decimal number 27 is decoded into the bit string "0 0 0 0 1 0 0 0 0 0 0 0 0 0 0 0 0 0 0 0 0 0 0 0 0 0 0 0 0 0 0 0", where a value of "1" is placed in the position for bit 27 given that the lowest order bit is bit position 0. The value of AX in text box 604 is then obtained through the logical OR of the bit string for A1 in text box 502 with the bit string for A2 in text box 602. Similarly, the value of BX in text box 604 is obtained through the logical OR of the bit string for B1 in text box 502 with the bit string for B2 in text box 602.

With reference to FIGS. 6A, 7A, 7B, and 7C, the model 605 includes model instructions for the feature 501 and the feature 601. The column labeled N in the model 605 includes model instruction numbers, which are consistent with the numbering of the points in FIGS. 6A and 7A. The columns labeled X and Y in the model 605 include the point coordinates in the model coordinate system of the associated point for each model instruction. The column labeled V in the model 605 includes accumulation increments in the first and sixth model instructions, and includes blocks of the bit strings AX and BX in the remaining model instructions. The bit string of AX in the example is divided into blocks and distributed across the second to fifth model instructions in the model 605, and the bit string of BX in the example is divided into blocks and distributed across the seventh to tenth model instructions in the model 605. The column labeled RST in the model 605 includes a reset command bit of "1" in the first model instruction, and the column labeled CMP in the model 605 includes a compare command bit of "1" in the model instructions for the last point in each set of points. Thus, in various embodiments, a model may be formed to represent more than one feature from more than one exemplar image.

Figure 8:
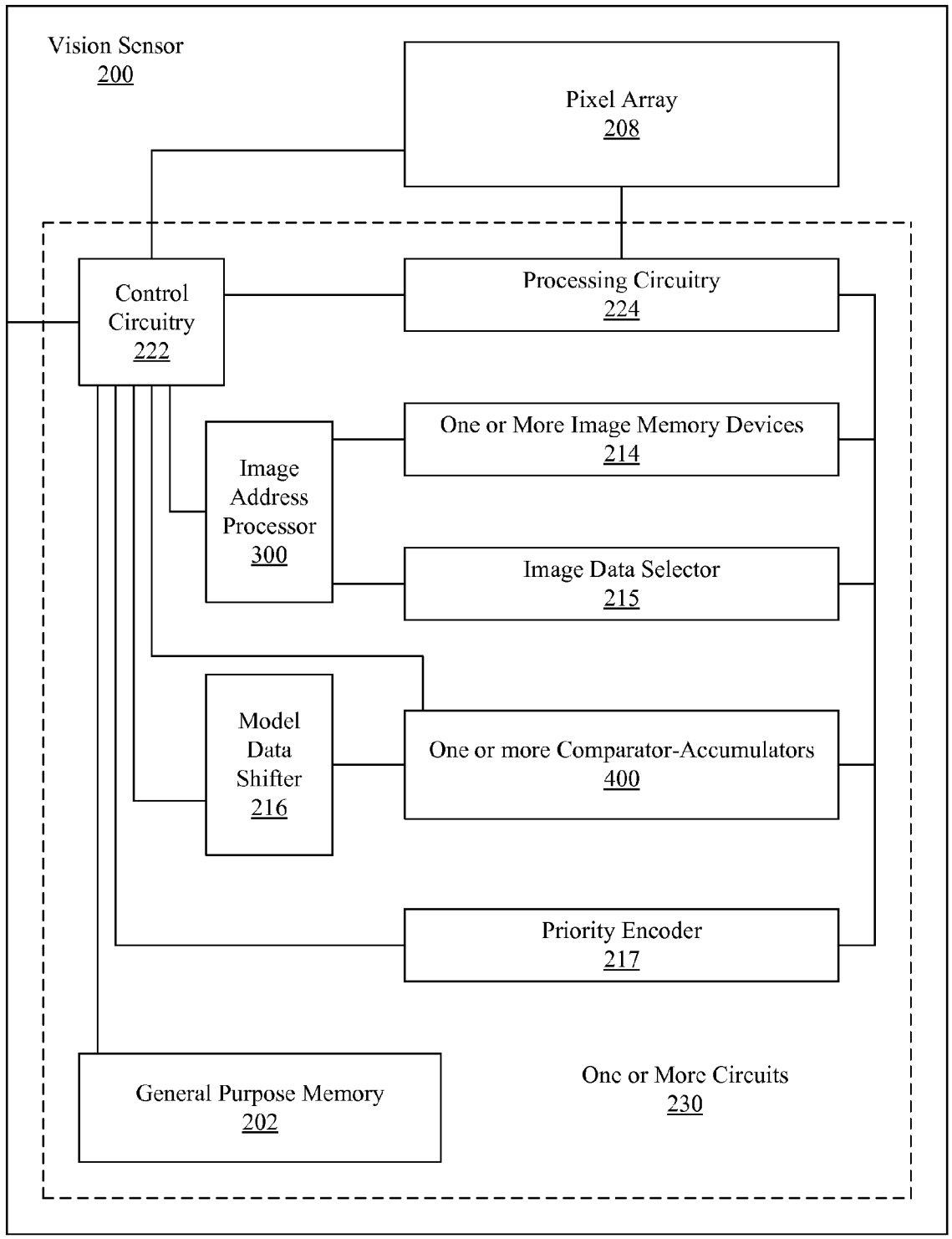
FIG. 8 illustrates a block diagram of a vision sensor in accordance with an embodiment of the present invention.

FIG. 8 illustrates an embodiment of the vision sensor 200. The vision sensor 200 includes the pixel array 208 and the one or more circuits 230. In various embodiments, the one or more circuits 230 include control circuitry 222, a general purpose memory 202, processing circuitry 224, an image address processor 300, one or more image memory devices 214, an image data selector 215, a model data shifter 216, one or more comparator-accumulators 400, and a priority encoder 217.

In various embodiments, the pixel array 208 is configured to provide one or more pixel signals based on sensed light for a scene being imaged. Also, in various embodiments, the processing circuitry 224 is configured to process the one or more pixel signals provided from the pixel array 208 to generate an image. In some embodiments, the one or more pixel signals provided from the pixel array 208 are analog signals, and the processing circuitry 224 is configured to perform analog-to-digital conversion to convert the one or more pixel signals to digital pixel values. In various embodiments, the processing circuitry 224 is configured to perform one or more pre-processing operations on the digital pixel values obtained from the one or more pixel signals, so as to provide pre-processed image data.

For example, in various embodiments, the processing circuitry 224 is configured to perform pre-processing for noise reduction to reduce noise in the digital pixel values. Image noise is random fluctuations of pixel values, which may be caused by electronic noise in the vision sensor 200, or the like. In various embodiments, the processing circuitry 224 is configured to accomplish noise reduction through a filtering process, such as median filtering in which an original pixel value is replaced with a median value of intensities of neighboring pixel values. In some embodiments, the processing circuitry 224 is configured to perform other types of filtering, such as low-pass filtering in which noise is reduced by convolving data of the pixel values with a mask that represents a smoothing operation so as to try to bring each pixel value closer to values of neighboring pixel values. It should be appreciated that median filtering and low-pass filtering are merely provided as examples of types of filtering and that, in various other embodiments, the vision sensor 200 may be configured to perform other types of filtering.

In various embodiments, the processing circuitry 224 is also configured to perform pre-processing to convert grayscale pixel values to binary pixel values. In some embodiments, the processing circuitry 224 is configured to perform a thresholding process that converts a grayscale pixel value into either a black pixel value or a white pixel value based on, for example, a comparison between the grayscale pixel value and a threshold value. Such thresholding processes allow for binarization of pixel values. In various embodiments, the processing circuitry 224 is also configured to perform a morphological closing operation on data in which a dilation is performed using a structuring element and then an erosion is performed on the resulting data using a structuring element. Such morphological closing operations may be employed, for example, to shrink background color holes that are within foreground regions in an image.

In various embodiments, the one or more image memory devices 214 are configured to store image data of an image. For example, in various embodiments, the processing circuitry 224 performs processing on pixel signals provided from the pixel array 208 and stores a result of the processing in the one or more image memory devices 214 as image data of an image. In various embodiments, the one or more image memory devices 214 each comprise a random access memory (RAM), or the like, for storing and providing data.

In various embodiments, the control circuitry 222 is configured to control the pixel array 208 to capture light and provide pixel signals, and is configured to control the processing circuitry 224 to process the pixel signals from the pixel array 208 to provide image data of an image. In some embodiments, the pixel array 208 is configured to capture light that is in the visible spectrum and to provide pixel signals based on the captured light. In some embodiments, the pixel array 208 is configured to capture light that is outside of the visible spectrum and to provide pixel signals based on the captured light. In some embodiments, the pixel array 208 is configured to allow for capturing light from both the visible spectrum and outside of the visible spectrum and to provide pixel signals based on the captured light.

In various embodiments, the control circuitry 222 is configured to receive model instructions from an external device (not shown in FIG. 8) for a model of one or more features, and is configured to store the model instructions in the general purpose memory 202. In various embodiments, the general purpose memory 202 comprises a RAM, or the like, for storing and providing data. In various embodiments, the general purpose memory 202 stores programs that can be executed by the control circuitry 222. In some embodiments, the general purpose memory 202 may be supplemented with an external memory (not shown) that is external to the vision sensor 200, and the vision sensor 200 may be configured in such embodiments to allow for transferring data between the external memory and the general purpose memory 202. In various embodiments, elements of FIG. 8 can be supplemented or omitted if desired for various different applications.

In various embodiments, the one or more circuits 230 are configured to search an image for one or more features using a model of the one or more features. In some embodiments, an image to be searched is stored in the one or more image memory devices 214, and model instructions of a model of one or more features to be used to search the image are stored in the general purpose memory 202. In various embodiments, the control circuitry 222 is configured to execute the model instructions from the general purpose memory 202, and to control the processing circuitry 224, the image address processor 300, the model data shifter 216, and the plurality of comparator-accumulators 400 based on the model instructions.

In some embodiments, each model instruction includes corresponding coordinates that specify a position with respect to a model reference point. Also, in some embodiments, the control circuitry 222 is configured to provide coordinates from the model instructions of the model to the image address processor 300, and the image address processor 300 is configured to transform the coordinates into transformed coordinates based at least partially on one or more transform values. In various embodiments, the image address processor 300 allows for transforming coordinates of a model in accordance with a geometric transformation.

Having the ability to transform coordinates of a model in accordance with a geometric transformation provides an advantage when searching for features in images where the features in the images may be rotated at different angles, scaled to different sizes, or translated to different positions in different images. In some instances, with the ability to geometrically transform a model of a feature, the model may be used to detect the feature in images regardless of a rotation, scale, or location of the feature in the images. In various embodiments, the image address processor 300 is configured to transform one or more coordinates of a model in accordance with one or more affine transform values.

In various embodiments, the image address processor 300 is configured to provide a first coordinate of transformed coordinates to the one or more image memory devices 214 to access the one or more image memory devices 214 and to cause the one or more image memory devices 214 to provide data addressed by the first coordinate of the transformed coordinates to the image data selector 215. In various embodiments, the image address processor 300 is configured to provide a second coordinate of the transformed coordinates to the image data selector 215 to cause the image data selector 215 to shift the data received from the one or more image memory devices 214 by an amount that is based on the second coordinate of the transformed coordinates.

In various embodiments, the control circuitry 222 is configured to provide accumulation increments and one or more values to the model data shifter 216 from a model, and the model data shifter 216 is configured to provide the one or more values and the accumulation increments to the one or more comparator-accumulators 400. In various embodiments, the one or more comparator-accumulators 400 are configured to compare one or more values obtained based on data of an image to be searched with one or more values from a model. Also, in various embodiments, the one or more comparator-accumulators 400 are configured to selectively perform accumulation to accumulate accumulation increments based on results of the comparisons.

In various embodiments, the processing circuitry 224 is configured to receive accumulated values from the one or more comparator-accumulators 400 and to form a binary tag word to indicate local maximum responses to comparisons between an image and model data. Also, in various embodiments, the priority encoder 217 is configured to receive a binary tag word from the processing circuitry 224 and to provide output to the control circuitry 222 based on the binary tag word. In various embodiments, the control circuitry 222 is configured to provide output from the vision sensor 200.

Figure 9:
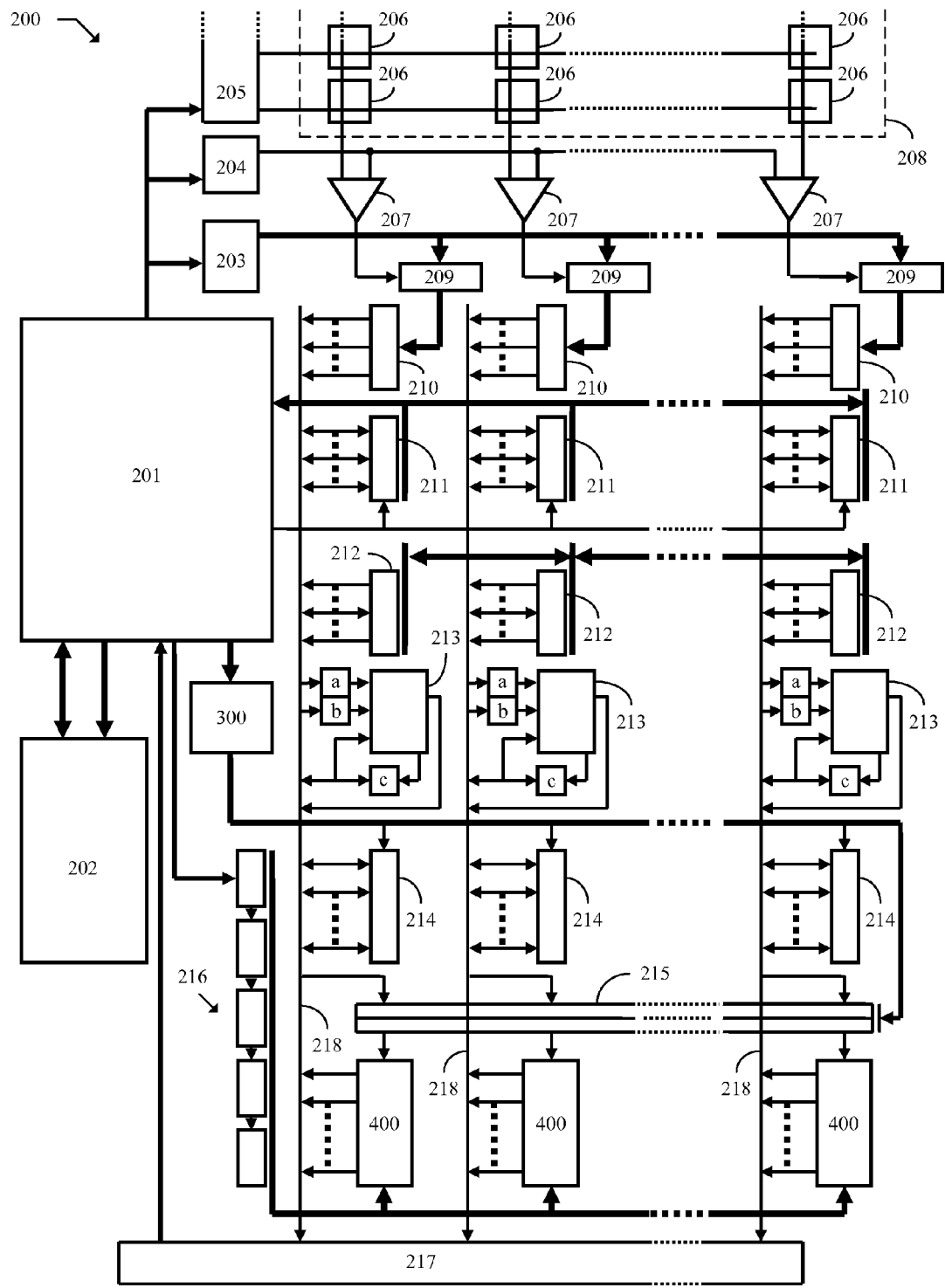
FIG. 9 illustrates a block diagram of a vision sensor in accordance with an embodiment of the present invention.

FIG. 9 illustrates an embodiment of the vision sensor 200. In various embodiments, the vision sensor 200 includes the pixel array 208, a pixel controller 205, a plurality of analog comparators 207, an analog ramp generator 204, a plurality of analog-to-digital converter (ADC) latches 209, and a digital ramp generator 203. In various embodiments, the pixel array 208 includes a plurality of pixel circuits 206 that are arranged in rows and columns. Also, in various embodiments, each pixel circuit 206 comprises a light sensitive element or photodetector, such as a photodiode or the like, to sample light intensity of a corresponding portion of a scene being imaged, and each pixel circuit 206 is configured to provide an analog pixel signal based on the sampled light intensity.

In various embodiments, the pixel controller 205 supplies control signals to the pixel circuits 206 in the pixel array 208 to control an operation of the pixel circuits 206. In some embodiments, pixel circuits 206 that are in a same row of the pixel array 208 share a common row control signal from the pixel controller 205, and pixel circuits 206 that are in a same column of the pixel array 208 share a common column readout line to provide output. In various embodiments, the pixel controller 205 controls the pixel circuits 206 to provide output row by row. Also, in various embodiments, the analog pixel signals output from each column of pixel circuits 206 in the pixel array 208 are input to a corresponding analog comparator 207.

In various embodiments, analog-to-digital conversion of analog pixel signals output from the pixel array 208 is performed using the plurality of analog comparators 207, the analog ramp generator 204, the plurality of ADC latches 209, and the digital ramp generator 203. In some embodiments, analog pixel signals output at each column of the pixel array 208 are compared, in the corresponding analog comparator 207, to a common analog reference level generated by the analog ramp generator 204. Also, in some embodiments, the digital ramp generator 203 is configured to produce a digital signal that is representative of the analog reference level generated by the analog ramp generator 204. In various embodiments, in a case where on any given column the analog reference level equals a level of the analog pixel signal, the corresponding analog comparator 207 generates a digital output that causes a corresponding ADC latch 209 to latch a value of the digital signal supplied by the digital ramp generator 203.

In various embodiments, the vision sensor 200 further includes a control processor 201, the general purpose memory 202, a plurality of image input registers 210, a plurality of input/output (I/O) registers 211, a plurality of shift registers 212, a plurality of arithmetic logic units (ALUs) 213, a plurality of image memory devices 214, and a plurality of data paths 218. In various embodiments, the control processor 201 is connected to the general purpose memory 202, from which it obtains programs and models to execute to control elements of the vision sensor 200. In various embodiments, each ADC latch 209 is connected to a corresponding image input register 210, and each image input register 210 is connected, by output data lines, to a corresponding data path 218.

In various embodiments, each data path 218 includes a serial data path that carries data in bit-serial form. In various other embodiments, each data path 218 may include a plurality of data lines for carrying data. In some embodiments, the plurality of data paths 218 are part of a bus. Also, in some embodiments, there is at least one data path 218 for each column of pixel circuits 206 in the pixel array 208. In various embodiments, each data path 218 is connected to a corresponding image input register 210, a corresponding I/O register 211, a corresponding shift register 212, a corresponding ALU 213, and a corresponding image memory device 214. Also, in various embodiments, the plurality of I/O registers 211 are each connected to the control processor 201 for inputting data from and outputting data to the control processor 201. In some embodiments, the plurality of shift registers 212 are each connected to their immediate neighbors on the left and right, if present. Also, in some embodiments, each ALU 213 is connected to the corresponding data path 218 through a set of corresponding registers, which include at least two data input registers (a and b), and a carry register (c).

In various embodiments, each image input register 210 makes digitized image data available, by way of the corresponding data path 218, to the corresponding I/O register 211, the corresponding shift register 212, the corresponding ALU 213, and the corresponding image memory device 214. In various processing operations, image data is buffered in the plurality of image memory devices 214 and processed using the plurality of ALUs 213. In various embodiments, processed image data or other data may be accessed by the control processor 201 though the plurality of I/O registers 211 for secondary data processing and/or external communication of data with external devices (not shown in FIG. 9) that are external to the vision sensor 200.

With reference to FIGS. 8 and 9, in various embodiments, the control circuitry 222 includes the control processor 201 and the pixel controller 205. Also, in various embodiments, the processing circuitry 224 includes the plurality of analog comparators 207, the analog ramp generator 204, the plurality of ADC latches 209, the digital ramp generator 203, the plurality of image input registers 210, the plurality of I/O registers 211, the plurality of shift registers 212, and the plurality of ALUs 213. In various embodiments, the one or more image memory devices 214 in FIG. 8 include the plurality of image memory devices 214 as illustrated in FIG. 9.

With reference to FIG. 9, in various embodiments the vision sensor 200 further includes the image address processor 300, the image data selector 215, the model data shifter 216, a plurality of comparator-accumulators 400, and the priority encoder 217. In various embodiments, each of the data paths 218 is connected to the image data selector 215. Also, in various embodiments, the control processor 201 is connected to the image address processor 300, and the image address processor 300 is connected to address inputs of the plurality of image memory devices 214 and a control input of the image data selector 215.

In some embodiments, the control processor 201 is connected to an input of the model data shifter 216, and an output of the model data shifter 216 is connected to an input of each of the plurality of comparator-accumulators 400. Each comparator-accumulator 400 is also connected to receive input from the image data selector 215. In various embodiments, the image data selector 215 comprises a bi-direction barrel shifter, or the like. Also, in various embodiments, each of the plurality of comparator-accumulators 400 is connected to a corresponding data path 218. In some embodiments, the priority encoder 217 is connected to each of the data paths 218 and is connected to the control processor 201. It should be appreciated that the embodiment of the vision sensor 200 illustrated in FIG. 9 is merely provided as an example and that, in various other embodiments, the vision sensor 200 may have other suitable designs.

Figures 10A, 10B:
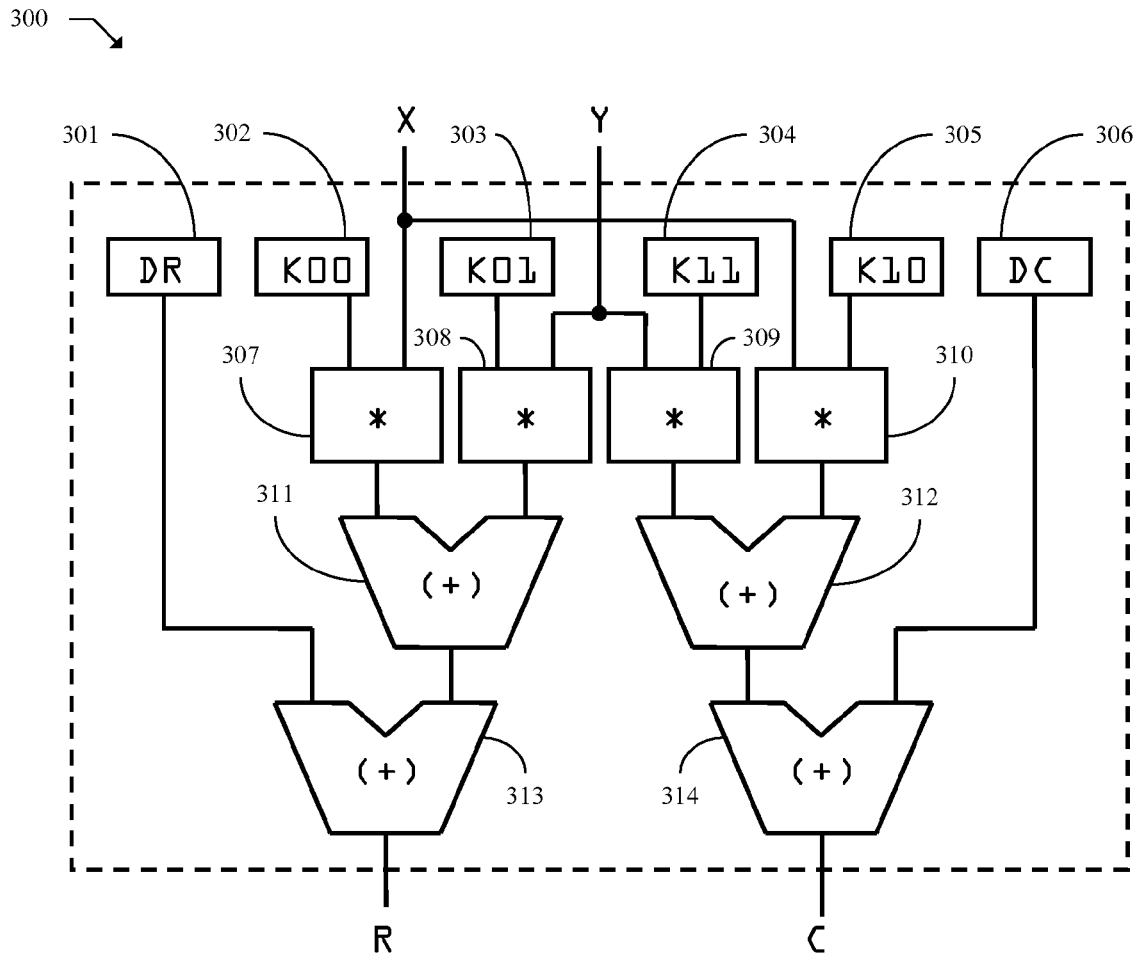
FIG. 10A illustrates a block diagram of an image address processor for transforming coordinates of a model in accordance with an embodiment of the present invention.
FIG. 10B illustrates equations for transforming coordinates of a model in accordance with an embodiment of the present invention.

FIG. 10A illustrates a block diagram of an embodiment of the image address processor 300. In various embodiments, the image address processor 300 is configured to transform coordinates of a model into transformed coordinates based at least partially on one or more transform values. In various embodiments, the image address processor 300 includes transform coefficient registers 302, 303, 304, and 305, an image row offset register 301, and an image column offset register 306, for storing transform values. In various embodiments, the image address processor 300 further includes signed multipliers 307, 308, 309, and 310, and adders 311, 312, 313, and 314.

In various embodiments, a first coordinate of a model (denoted X in FIG. 10A), and a second coordinate of the model (denoted Y in FIG. 10A) are provided as input to the image address processor 300. With reference to FIGS. 9 and 10A, in various embodiments the control processor 201 is configured to fetch a model instruction of a model from the general purpose memory 202 and to provide coordinates that are included in the model instruction to the image address processor 300. For example, with reference to FIGS. 6C, 9, and 10A, the control processor 201 may be configured to fetch a model instruction of a model, such as a first model instruction of the model 503 that is provided as an example model, from the general purpose memory 202 and to provide coordinates that are included in the model instruction, such as the coordinates (−7, −2) in the example, to the image address processor 300. In the example, the value of −7 for a first coordinate would be provided as the X input to the image address processor 300, and the value of −2 for a second coordinate would be provided as the Y input to the image address processor 300.

With reference to FIG. 10A, in various embodiments the transform coefficient registers 302, 303, 304, and 305 are writable to store affine transform coefficients K00, K01, K11, and K10, respectively, where the values of K00, K01, K11, and K10 are settable to enable performing desired transformations. In various embodiments, the image row offset register 301 is writable to store a row offset value DR, and the image column offset register 306 is writable to store a column offset value DC, where the values DR and DC are settable. With reference to FIGS. 9 and 10A, in various embodiments the control processor 201 is configured to set the values K00, K01, K11, K10, DR, and DC in the image address processor 300 based on a desired geometric transformation for a model.

In various embodiments, the signed multiplier 307 receives an input from the transform coefficient register 302 and an input that is a first coordinate to be transformed, and provides an output to the adder 311. Also, in various embodiments, the signed multiplier 308 receives an input from the transform coefficient register 303 and an input that is a second coordinate to be transformed, and provides an output to the adder 311. In various embodiments, the signed multiplier 309 receives an input from the transform coefficient register 304 and an input that is the second coordinate to be transformed, and provides an output to the adder 312. Also, in various embodiments, the signed multiplier 310 receives an input from the transform coefficient register 305 and an input that is the first coordinate to be transformed, and provides an output to the adder 312.

In various embodiments, the adder 311 receives input from the signed multiplier 307 and the signed multiplier 308, and provides output to the adder 313. Also, in various embodiments, the adder 312 receives input from the signed multiplier 309 and the signed multiplier 310, and provides output to the adder 314. In various embodiments, the adder 313 receives input from the image row offset register 301 and the adder 311, and provides as output a first transformed coordinate (denoted R in FIG. 10A). Also, in various embodiments, the adder 314 receives input from the image column offset register 306 and the adder 312, and provides as output a second transformed coordinate (denoted C in FIG. 10A). Thus, in the embodiment of FIG. 10A, the image address processor 300 allows for transforming coordinates (X, Y) into transformed coordinates (R, C) based on a plurality of transform values K00, K01, K11, K10, DR, and DC.

FIG. 10B provides a text box 315 with equations that specify a relationship between the (X, Y) inputs and the (R, C) outputs for the embodiment of the image address processor 300 of FIG. 10A. As illustrated in FIG. 10B, the equation for R is provided as R=X*K00+Y*K01+DR, and the equation for C is provided as C=X*K10+Y*K11+DC. Thus, the embodiment of the image address processor 300 of FIG. 10A allows for transforming coordinates of a model in accordance with geometric transformations, such as a rotation, a scaling, or a translation, by setting the transform values for a desired geometric transformation. By allowing for geometric transformations through use of the image address processor 300, a model of one or more features can be used for pattern matching for different rotations, scales, and translations of the one or more features in images.

In the embodiment of the image address processor 300 of FIG. 10A, the image address processor 300 allows for transforming coordinates based on the six transform values of K00, K01, K11, K10, DR, and DC. Thus, the embodiment of the image address processor 300 of FIG. 10A allows for six degrees of freedom for transformations. Of course, it should be understood that in various other embodiments of the image address processor 300, more transform values than six may be employed to allow for more than six degrees of freedom for transformations. For example, in various embodiments, another three transform values are provided in the image address processor 300 and the image address processor 300 is configured to further allow for transformations for perspective distortions. It should also be understood that in various other embodiments, less transform values than six may be employed in embodiments of the image address processor 300. For example, various embodiments of the image address processor 300 may allow for setting just two transform values to allow for translations.

Also, it should be appreciated that the embodiment of the image address processor 300 illustrated in FIG. 10A is merely provided as an example of a design for the image address processor 300 and that, in various other embodiments, different designs may be used for the image address processor 300 for transforming coordinates.

Figure 11:
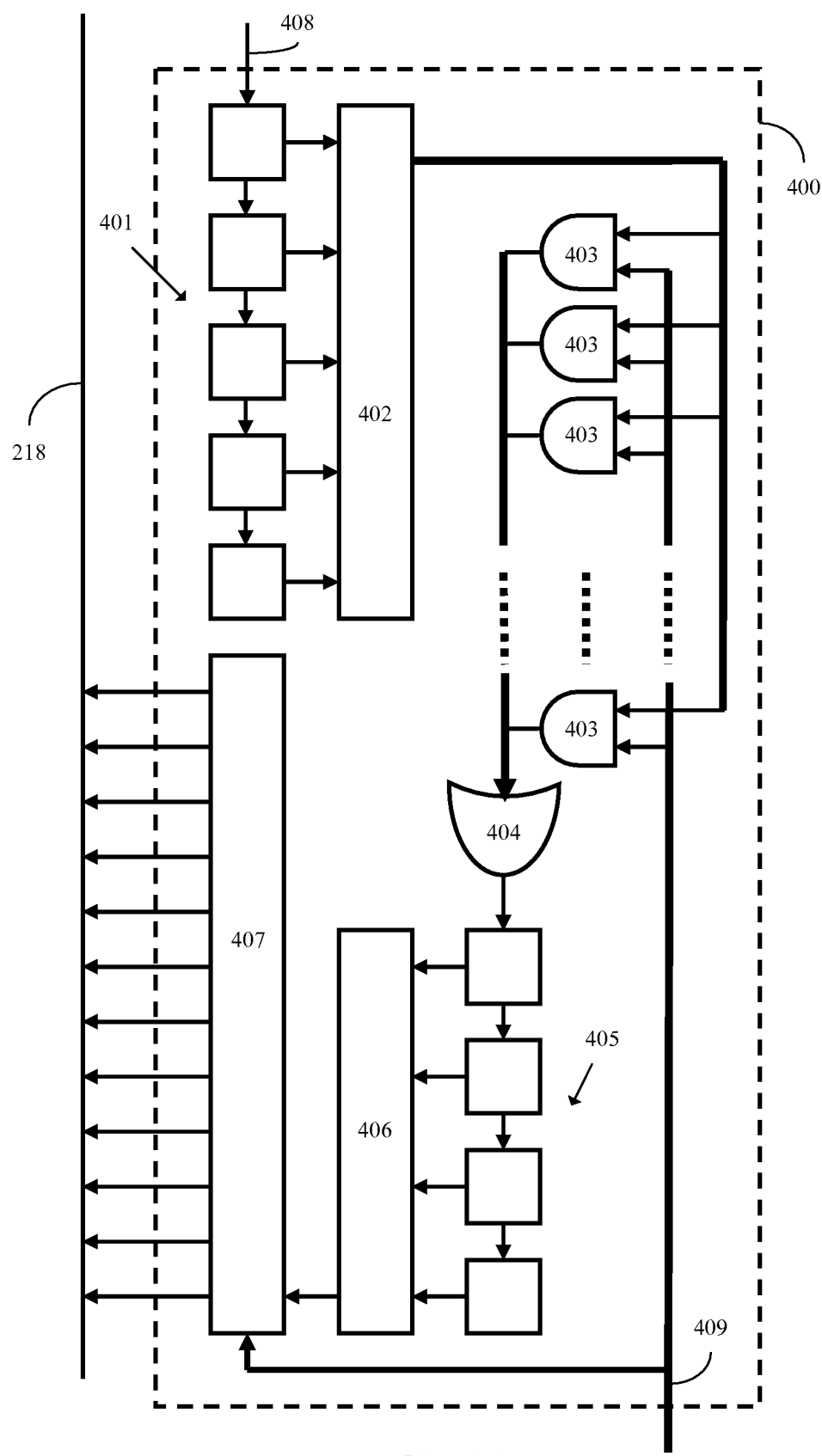
FIG. 11 illustrates a comparator-accumulator in accordance with an embodiment of the present invention.

FIG. 11 illustrates a block diagram of an embodiment of a comparator-accumulator 400. In various embodiments, the comparator-accumulator 400 includes an image data shifter 401, an image data decoder 402, a plurality of AND gates 403, an OR gate 404, a match shifter 405, a match encoder 406, and a match accumulator 407. In various embodiments, the image data shifter 401 is configured to receive data on an image data input line 408 and to shift the data by one position within the image data shifter 401 each time the image data shifter 401 is clocked to shift. Also, in various embodiments, the image data shifter 401 is configured to provide output to the image data decoder 402.

In various embodiments, the image data decoder 402 is configured to decode a value provided from the image data shifter 401, and to provide each bit of a decoded value to a corresponding first input of a corresponding AND gate of the plurality of AND gates 403. Also, in various embodiments, each bit of one or more model values of a model is provided over one or more model data input lines 409 to a corresponding second input of a corresponding AND gate of the plurality of AND gates 403. For example, with reference to FIGS. 6B, 6C, 9, and 11, in a case where a model, such as the model 503 is executed by the control processor 201, the bit string for set A1 illustrated in FIG. 6B may be reconstructed in the model data shifter 216 by having the control processor 201 provide the value from the V column of each of the second to fifth model instructions in the model 503 to the model data shifter 216, and then the model data shifter 216 may provide each bit of the bit string to a corresponding second input of a corresponding AND gate of the plurality of AND gates 403 over the one or more model data input lines 409.

Moreover, in various embodiments, bits from an image may be shifted into the image data shifter 401 and then decoded by the image data decoder 402 through binary expansion into a bit string with a "1" bit in a bit position corresponding to a decimal value of a binary number in the image data shifter 401, and a "0" bit in all other positions, where a low order bit in the decoded bit string corresponds to a bit position of 0. Then, in various embodiments, the decoded bit string from the image data decoder 402 may be compared using the plurality of AND gates 403 with the bit string provided over the one or more model data input lines 409 that has been reconstructed from values in a model. In various embodiments, the OR gate 404 receives an output of each of the plurality of AND gates 403, and provides an output bit of "1" in a case where any of the outputs of the plurality of AND gates 403 is "1". In some embodiments, the OR gate 404 may be replaced with a plurality of OR gates configured to determine if any of the plurality of AND gates 403 have output a bit with a value of "1". In various embodiments, an output of the OR gate 404 is indicative of whether or not a match has been found between image data of an image and model data of a model for a particular geometric transformation of the model and a particular positioning of the geometrically transformed model with respect to the image. In various embodiments, the plurality of AND gates 403 and the OR gate 404 may be considered as a comparator. Of course, it should be appreciated that the plurality of AND gates 403 and the OR gate 404 are merely provided as an example of a design for performing a comparison and that, in various other embodiments, other types of comparators may be employed.

In various embodiments, an output of the OR gate 404 is provided to the match shifter 405, and the match shifter 405 is configured to input a bit provided from the OR gate 404 and to shift the other bits in the match shifter 405 by one position each time the match shifter 405 is clocked. In various embodiments, data in the match shifter 405 is output to the match encoder 406, and the match encoder 406 is configured to encode a value represented by the stored bits in the match shifter 405, and to provide an output to a clock of the match accumulator 407. In various embodiments, the match accumulator 407 receives an accumulation increment of a model over the one or more model data input lines 409, and is configured to accumulate the accumulation increment when clocked based on a value of an output of the match encoder 406. Also, in various embodiments, the match accumulator 407 is configured to output a value that has been accumulated in the match accumulator 407 to a corresponding data path 218.

With reference to FIGS. 6C, 8, 9, and 11, in various embodiments the control circuitry 222 is configured to send a signal to each of the comparator-accumulators 400 to cause the match accumulator 407 in each of the comparator-accumulators 400 to be reset to a default value when the control circuitry 222 executes a model instruction that includes a reset command, such as, for example, the bit with value "1" in the RST column for the first model instruction in the model 503. Also, in various embodiments, the control circuitry 222 is configured to send a signal to allow for accumulation by the match accumulator 407 in each of the comparator-accumulators 400 when the control circuitry 222 executes a model instruction that includes a compare command, such as, for example, the bit with value "1" in the CMP column for the fifth model instruction in the model 503. In such embodiments, the match accumulator 407 in each of the comparator-accumulators 400 may also be clocked by an output of the corresponding match encoder 406, such that when accumulation is allowed, the match accumulator 407 either performs or does not perform accumulation depending on a value output from the corresponding match encoder 406.

With reference to FIG. 9, in various embodiments the vision sensor 200 allows for acquiring and efficiently performing processing on an image to localize a maximum response to a stored model of one or more features. In various embodiments, pixel values are automatically or semi-automatically extracted from an exemplar image or set of exemplar images to produce an image processing kernel or model. Also, in various embodiments, iconic-level pattern matching is performed by the vision sensor 200 using the model. In some embodiments, the coordinates of model data are geometrically transformed by the vision sensor 200 and systematically applied to a candidate image to generate comparator-accumulator responses, each of which represents a measure of similarity between the model as geometrically transformed and a corresponding candidate location in the image. In various embodiments, the vision sensor 200 allows for searching the comparator-accumulator responses to localize points of maximum similarity, the coordinates of each of which correspond to a respective location of a potential match between a geometric transformation of the model and the candidate image. Various embodiments of the present invention allow for providing an efficient method and vision sensor to capture an image and identify some or all transformations of a trained model or iconic-level exemplar pattern that result in the model being maximally correlated with the captured image.

Figure 12:
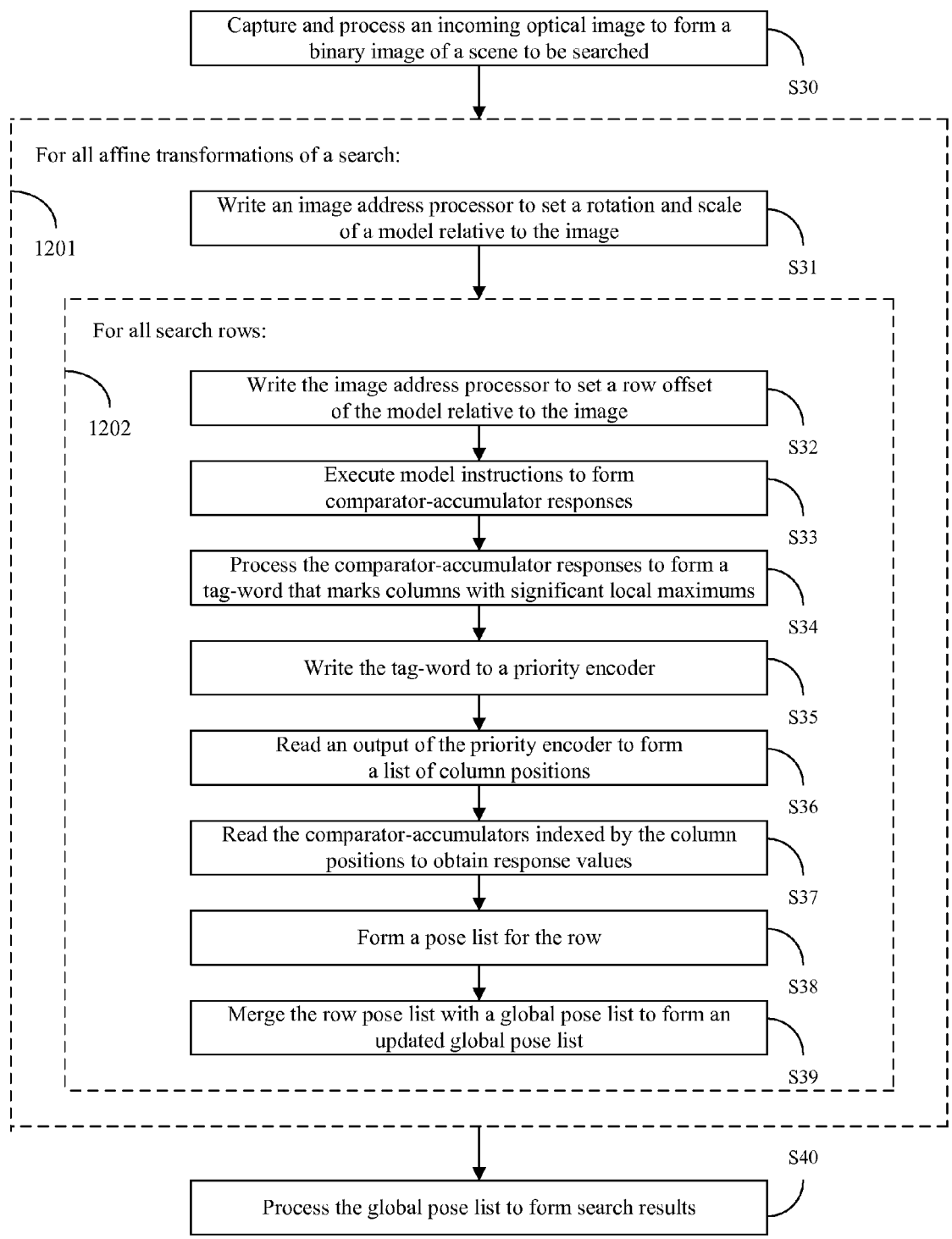
FIG. 12 illustrates a flowchart of a method in accordance with an embodiment of the present invention for capturing an image and for performing pattern matching with respect to the image.

FIG. 12 illustrates a flowchart of a method in accordance with an embodiment of the present invention. In various embodiments, a method allows for using a vision sensor, such as the vision sensor 200 of FIG. 9, to search for features in an image that exhibit maximum similarity to a trained model. In S30, an incoming optical image is captured and processed to form a binary image of a scene to be searched. With reference to FIGS. 9 and 12, in various embodiments, the pixel circuits 206 of the pixel array 208 are each configured to sample light intensity of a corresponding portion of a scene being imaged and to provide pixel signals based on the sampled light intensity. In various embodiments, the vision sensor 200 executes a program that digitizes and processes data collected in the pixel circuits 206 to form a binary image and to store the binary image in the plurality of image memory devices 214. In some such embodiments, the binary image stored in the plurality of image memory devices 214 is formed to retain information from which boundaries of objects, which are present in the physical scene being imaged, can be reliably inferred from image data for the binary image.

In various embodiments, light for a physical scene to be inspected is sampled by the pixel array 208 to provide pixel signals, the pixel signals are digitized by the plurality of analog comparators 207, the analog ramp generator 204, the digital ramp generator 203, and the plurality of ADC latches 209, and a binary image is formed from the digitized pixel signals and stored in the plurality of image memory devices 214. In some embodiments, the pixel signals are digitized into grayscale intensity values, and then the grayscale intensity values are compared to a reference level using the plurality of ALUs 213 to arrive at a binary image, where the reference level may be stored by the control processor 201 into the plurality of I/O registers 211 for the comparison. In some embodiments, the vision sensor 200 is configured to process a captured image to filter certain spatial frequencies and to digitize the filtered image to form a binary image to be stored in the plurality of image memory devices 214. In some embodiments, the vision sensor 200 is configured to acquire and process multiple images to form a composite binary result that is then stored in the plurality of image memory devices 214. Thus, various embodiments of the vision sensor 200 allow for forming a one bit per pixel image that is representative of a physical scene to be inspected.

With reference again to FIG. 12, the method then continues to an outermost loop 1201. The method of FIG. 12 includes the outermost loop 1201 and an innermost loop 1202 nested in the outermost loop 1201. The loops 1201 and 1202 of the method of FIG. 12 allow for systematically comparing geometric transformations of a model with a stored binary image. The innermost loop 1202 allows for traversing a translation dimension one row of the image at a time, while the outermost loop 1201 allows for traversing rotation and/or scale dimensions of a search space. In various embodiments of searching, a sampling rate along any given dimension in search space may be set by an expected response of the model both to an acceptable image feature match and to an expected response of the model to image features that are very similar but do not represent a true match.

In various embodiments, the outermost loop 1201 repeats for all affine transformations of a search. With reference to FIGS. 9, 10A, and 12, in S31 affine transform coefficients are written to the image address processor 300 to establish a rotation and a scale of a model relative to the binary image.

In various embodiments, the control processor 201 is configured to write the affine transform coefficients to the image address processor 300. Also, in various embodiments, the affine transform coefficients written to set the rotation and scale are K00, K01, K11, and K10 in the transform coefficient registers 302, 303, 304, and 305, respectively. The method then continues to the innermost loop 1202.

In various embodiments, the innermost loop 1202 repeats for all search rows in the binary image. In various embodiments, in S32 one or more translation coefficients are written to the image address processor 300 to establish a translation of the model relative to the binary image. In some embodiments, the vision sensor 200 is configured to accumulate a full row of results in parallel, so a column translation component (DC) may be set to "0" in the image column offset register 306 since such comparisons are translation invariant along a column axis of the binary image. In various embodiments, the control processor 201 writes a row translation component (DR) to the image row offset register 301 to set a row offset of the model relative to the binary image. The method then continues to S33.

In S33, model instructions of the model are executed to form comparator-accumulator responses. With reference to FIGS. 2, 9, and 12, in various embodiments the process of executing the model causes the plurality of comparator-accumulators 400 to compute a digital value that represents a measure of similarity between the binary image and the model. In various embodiments, the model is compared with the binary image at each column of the binary image along a current row simultaneously. In various embodiments, the one or more circuits 230 are configured to compare the model, after transforming one or more coordinates of the model, with the binary image for each of a plurality of positionings of the model relative to the image concurrently. In some such embodiments, the plurality of positionings include positionings of a reference point of the model at a plurality of locations in a row of the image. An example of a reference point of a model is shown by the reference point 580 of the model 503 in the example of FIGS. 6A and 6C. In various embodiments, a geometrically transformed model may be compared with the binary image for each of a plurality of positionings of the model along a current search row relative to the image concurrently. Such parallel processing allows for efficient searches for features in images.

Figure 14:
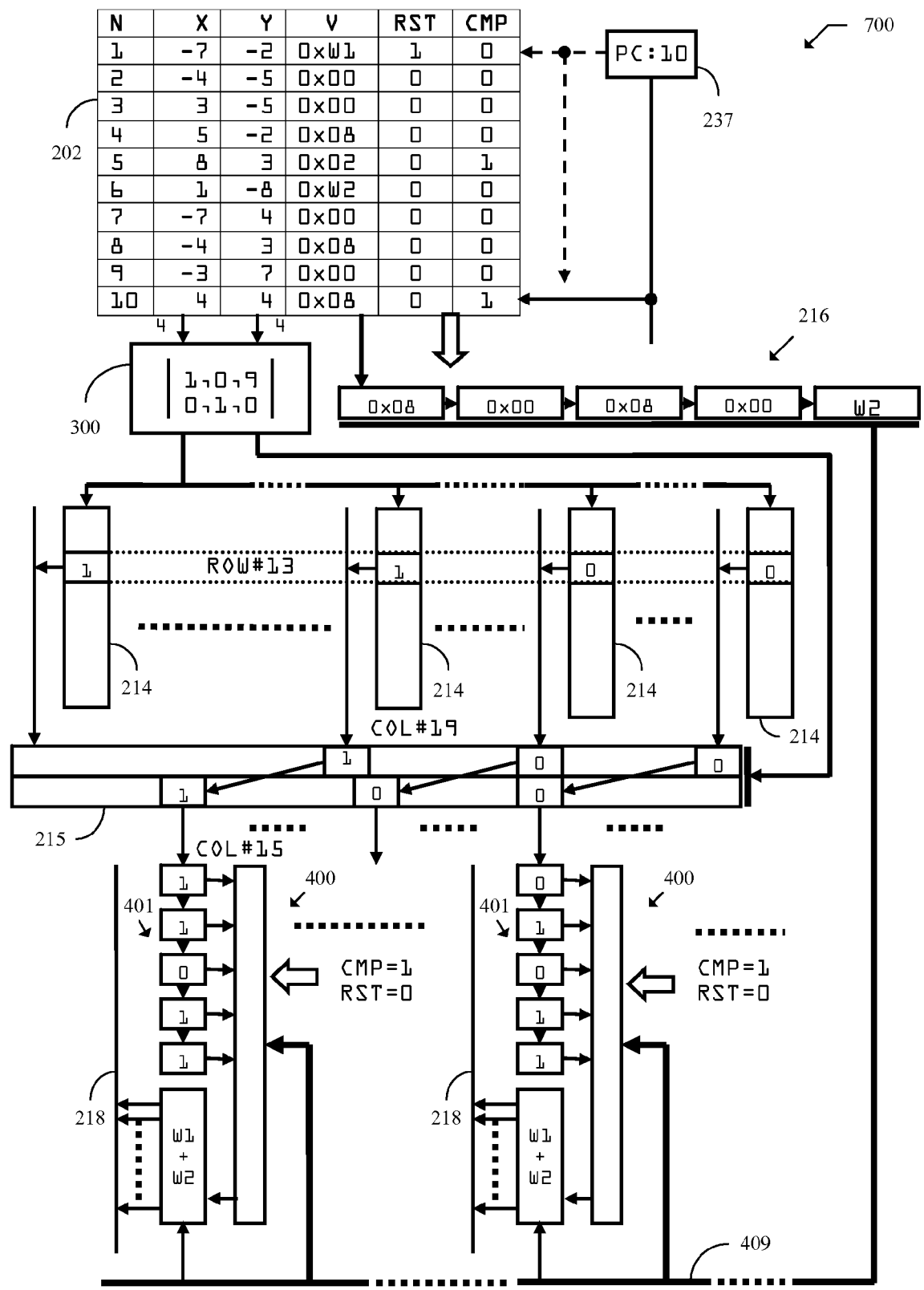
FIG. 14 illustrates an example of an operation of a vision sensor when executing example model instructions in accordance with an embodiment of the present invention.

FIG. 14 illustrates an example 700 of decoding and executing model instructions in accordance with an embodiment of the present invention. The example 700 illustrates the general purpose memory 202, a program counter 237, the image address processor 300, the model data shifter 216, the plurality of image memory devices 214, the image data selector 215, the plurality of comparator-accumulators 400, the data paths 218, and the one or more model data input lines 409 in accordance with an embodiment of the present invention. In the example 700, the general purpose memory 202 is storing the model 605 of FIG. 7C, which is shown merely as an example of a type of model. With reference to FIGS. 9 and 14, in various embodiments, the control processor 201 includes the program counter 237, and the control processor 201 is configured to read and decode model instructions stored in the general purpose memory 202 by reading and decoding a model instruction pointed to by a value in the program counter 237 and then incrementing the value in the program counter 237 to a next value. In the example 700, the current value of the program counter 237 is 10, so the example 700 illustrates an execution of the tenth model instruction stored in the general purpose memory 202.

In the example 700, the image address processor 300 has been written with the following transform values for the example: K00=1, K01=0, K10=0, K11=1, DR=9, and DC=0. Thus, in the example 700, the image address processor 300 transforms coordinates (X, Y) for each model instruction according to the following two equations: (i) R=X*1+Y*0+9; and (ii) C=X*0+Y*1+0. It should be appreciated that the transform values provided in the example 700 are merely provided as an example, and that the transform values in the image address processor 300 can be changed for different desired geometric transformations of a model.

Figure 13:
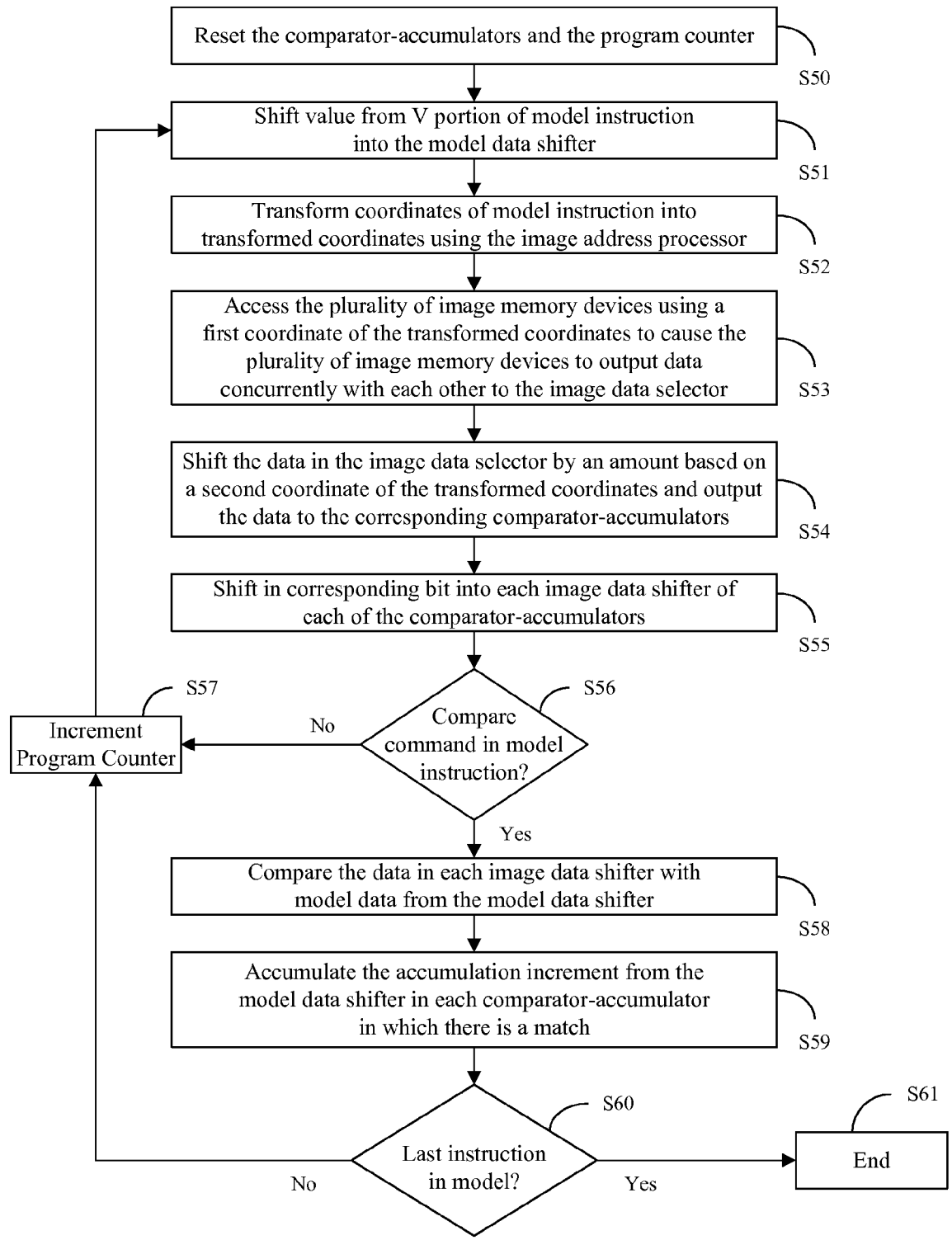
FIG. 13 illustrates a flowchart of a method in accordance with an embodiment of the present invention of executing model instructions of a model of one or more features.

FIG. 13 illustrates a flowchart of a method in accordance with an embodiment of the present invention. The method of FIG. 13 may be used in various embodiments in the step S33 of the method of FIG. 12 to execute a model. With reference to FIGS. 9, 13, and 14, in S50 the plurality of comparator-accumulators 400 and the program counter 237 are reset to default values, and the method continues to S51. In S51, a value from a V portion of a model instruction pointed to by a value in the program counter 237 is shifted into the model data shifter 216. For example, the example 700 shows a state of the program counter 237 and the model data shifter 216 when the tenth example model instruction in the general purpose memory 202 is being executed after execution of the example model instructions one through nine in the general purpose memory 202 of the example 700. In the example 700, the value "0x08" from the V column of the tenth model instruction in the example is shifted into the model data shifter 216, which shifts the values from the V column for the sixth through ninth model instructions in the example over one position in the model data shifter 216. In various embodiments, the model data shifter 216 assembles data from multiple model instructions to construct a model data input word to be distributed to the plurality of comparator-accumulators 400. The method then continues to S52.

In S52, a coordinate of a currently executing model instruction is transformed into a transformed coordinate using the image address processor 300. For example, in the example 700, when the tenth model instruction in the example 700 is executed, the coordinates (4, 4) are provided to the image address processor 300 and the image address processor 300 provides the transformed coordinates of (13, 4) based on the transform values set in the example 700. In various embodiments, the image address processor 300 is configured to provide a first coordinate of the transformed coordinates to the plurality of image memory devices 214, and is configured to provide a second coordinate of the transformed coordinates to the image data selector 215. For example, in the example 700, the image address processor 300 sends the value of "13" for the first coordinate of the transformed coordinates to the plurality of image memory devices 214 and the image address processor 300 sends the value of "4" for the second coordinate of the transformed coordinates to the image data selector 215. The method then continues to S53.

In S53, the plurality of image memory devices 214 are accessed using a first coordinate of the transformed coordinates to cause the plurality of image memory devices 214 to output data concurrently with each other to the image data selector 215. For example, in the example 700, the plurality of image memory devices 214 are accessed using the value "13" of the first coordinate of the transformed coordinates, which causes the plurality of image memory devices 214 to output data concurrently with each other to the image data selector 215 for data in row 13 of the binary image stored in the plurality of image memory devices 214. The data in the image memory devices 214 in the example 700 is merely shown as example data for an example of a binary image. In the example 700, the data for the binary image in row 13 and column 19 of the binary image is a bit of value "1", which is shown as being provided with the other data from row 13 to the image data selector 215. The method then continues to S54.

In S54, the data in the image data selector 215 is shifted by an amount that is based on a second coordinate of the transformed coordinates and is output to the corresponding comparator-accumulators 400. For example, in the example 700, the image data selector 215 receives the value "4" for the second coordinate of the transformed coordinates and then shifts the data in the image data selector 215 by 4 positions to the left. Thus, in the example 700, the bit with value "1" from row 13 and column 19 of the binary image data is shifted by four positions to the left in the image data selector 215 and then output to the comparator-accumulator 400 for column 15. The method then continues to S55.

In S55, each image data shifter 401 of each comparator-accumulator 400 of the plurality of comparator-accumulators 400 shifts in a corresponding bit provided from the image data selector 215. For example, in the example 700, the image data shifter 401 of the comparator-accumulator 400 for column 15 shifts in a bit of value "1" from the image data selector 215, and also shifts the bits obtained through execution of the previous four model instructions down one position in the image data shifter 401 of the comparator-accumulator 400 for column 15. The method then continues to S56.

In S56 it is determined whether or not the model instruction currently being executed includes a compare command. In a case where the currently executed model instruction does not include a compare command, the method continues to S57 where the program counter 237 is incremented, and then the method returns to S51 so as to execute a next model instruction in the model. On the other hand, in a case where the currently executed model instruction does include a compare command, the method continues to S58. For example, in example 700, the tenth model instruction includes a compare command as indicated by the bit of value "1" in the column CMP for the tenth model instruction.

In S58, the data in each image data shifter 401 of each of the comparator-accumulators 400 is decoded into a corresponding bit string and compared with a bit string formed from data from the model data shifter 216. For example, in the example 700, the binary value "11011" in the comparator-accumulator 400 of column 15, which corresponds to a decimal value of 27, is decoded into the bit string "0 0 0 0 1 0 0 0 0 0 0 0 0 0 0 0 0 0 0 0 0 0 0 0 0 0 0 0 0 0 0 0", where a value of "1" is placed in the position for bit 27 given that the lowest order bit is bit position 0. Also, in the example 700, the values "0x08", "0x00", "0x08", and "0x00" from the model data shifter 216 are combined in binary form to form the bit string "0 0 0 0 1 0 0 0 0 0 0 0 0 0 0 0 0 0 0 0 1 0 0 0 0 0 0 0 0 0 0 0", which is provided to each of the plurality of comparator-accumulators 400 over the one or more model data input lines 409. Then, in the example 700, the comparator-accumulator 400 of column 15 performs a logical AND of the bit string "0 0 0 0 1 0 0 0 0 0 0 0 0 0 0 0 0 0 0 0 0 0 0 0 0 0 0 0 0 0 0 0" with the bit string "0 0 0 0 1 0 0 0 0 0 0 0 0 0 0 0 0 0 0 0 1 0 0 0 0 0 0 0 0 0 0 0", which results in a non-zero value of "0 0 0 0 1 0 0 0 0 0 0 0 0 0 0 0 0 0 0 0 0 0 0 0 0 0 0 0 0 0 0 0". In the example 700, since the result of the comparison is a non-zero value, there is a match. In various embodiments, the plurality of comparator-accumulators 400 compare, concurrently with each other, one or more corresponding values obtained based on data of the binary image with one or more values of the model. The method then continues to S59.

In S59, an accumulation increment provided from the model data shifter 216 is accumulated in each comparator-accumulator 400 of the plurality of comparator-accumulators 400 in which a match has been found in S58. For example, in the example 700, the model data shifter 216 provides an accumulation increment with a hexadecimal value of "0xW2" when executing the tenth model instruction, where "W2" is any set weight for an accumulation increment that is provided from the sixth model instruction in the example 700. In various embodiments, where there is a non-zero comparison in a comparator-accumulator 400, the non-zero output from the comparison causes an accumulator of the comparator-accumulator 400 to be clocked and, thus, to accumulate the accumulation increment from the model data shifter 216. In the example 700, the comparator-accumulator 400 in column 15 has a match and, thus, accumulates the accumulation increment of 0xW2 to an already accumulated value of 0xW1 in the example 700. As a consequence, in the example 700, the value of 0xW1+0xW2 stored in the comparator-accumulator 400 for column 15 indicates that there has been a perfect match between the executed model, as transformed by the image address processor 300, and the binary image stored in the plurality of image memory devices 214 for a case in which a reference point of the model is positioned at row 9 (DR=9) and column 15 of the binary image. The method then continues to S60.

In S60, it is determined whether or not the currently executed model instruction is a last instruction in the model being executed. In a case where it is determined that the currently executed model instruction is not the last instruction in the model, the method continues to S57 where the program counter 237 is incremented, and then returns to S51 to execute a next model instruction. On the other hand, in a case where it is determined that the currently executed model instruction is the last instruction in the model, the method of FIG. 13 ends in S61.

Referring again to FIG. 12, once the model instructions of the model have been executed in S33 to form comparator-accumulator responses, the method of FIG. 12 continues to S34. With reference to FIGS. 9 and 12, in S34 the values accumulated in each of the plurality of comparator-accumulators 400 from execution of the model are processed to form a tag-word that marks columns that have significant local maximum values in the associated comparator-accumulators 400. In various embodiments, a response of the model along a current row in the search is processed using the plurality of ALUs 213 to produce a bit map of the local maximums along the row. Such processing may be accomplished by various methods, such as, for example, the use of one-dimensional grayscale morphological operations to successively filter out weaker values in a local neighborhood and comparing the filtered result to a predefined global minimum response to form a binary tag-word having one bit for each column of the binary image, where a logic value of "1" in the binary tag-word for a column represents the presence of a local maximum response from the comparator-accumulator 400 associated with the column that is greater than the predefined global minimum response. In various embodiments, a window size may be specified by at least a number of columns to define a size of local neighborhoods for which local maximum responses are determined. The method then continues to S35. In S35, the binary tag-word formed in S34 is provided to the priority encoder 217, and the method then continues to S36.

In S36, the priority encoder 217 is read by the control processor 201 to form a list of columns for the currently processed row that are associated with the local maximum responses from execution of the model. In various embodiments, the priority encoder 217 is configured such that the priority encoder outputs a column coordinate of a most significant bit with value "1" in the binary tag word, and then each time the priority encoder 217 is read by the control processor 201, it responds with a column coordinate of a next most significant bit of the binary tag-word with value "1", until it outputs a column coordinate of last bit with a value of "1" in the binary tag-word. In such embodiments, the control processor 201 may be able to obtain column coordinates for all local maximum responses in the currently processed row in as many steps as there are valid local maximums for the row, which in practice may be a small number. In various embodiments, the control processor 201 is configured to store the column coordinates for the currently processed row that are obtained from the priority encoder 217 in a list in the general purpose memory 202 for subsequent processing by the control processor 201. In various embodiments, for some executions of the model for a currently processed row, the execution of the model may result in no local maximum responses from the plurality of comparator-accumulators 400 that meet a predefined global minimum response, in which case the binary tag-word would be all zeroes, and no column positions would be added to the list of column positions for the row by the control processor 201. The method then continues to S37.

In S37, the control processor 201 uses the list of column coordinates formed in step S36 to access corresponding comparator-accumulators 400 to read accumulated values or results stored in the corresponding comparator-accumulators 400. The method then continues to S38. In S38, the accumulated values or responses accessed from the comparator-accumulators 400 are combined with row, column, angle, and scale coordinates by the control processor 201 to form a list of poses that each contain search space coordinates for potential matches along the currently processed row. In various embodiments, the row for each pose is set as the currently processed row of the binary image, and the column for each pose is set as the column of the corresponding comparator-accumulator 400 which is read to provide the accumulated value for the pose. Also, in various embodiments, the angle and scale information for the pose are provided based on the transform values that are currently set in the image address processor 300.

In various embodiments, the control processor 201 is configured to record any poses of the model relative to the binary image that result in at least a partial match between the model and the binary image. In various embodiments, each of the poses specifies a corresponding row of the image and a corresponding column of the image. In some embodiments, each of the poses further specifies a corresponding angle of rotation and a corresponding scale value of the model. Also, in some embodiments, each of the poses further specifies an accumulated value read from a corresponding comparator-accumulator 400. In various embodiments, the control processor 201 is configured to form a pose list for the currently processed row based on column coordinates in the list of column coordinates formed in step S36. The method then continues to S39.

In S39, the row pose list with poses for the currently processed row is merged with a global pose list to form an updated global pose list. In various embodiments, the control processor 201 is configured to merge the list of poses from step S38 with a global pose list that has been accumulated up until the current search step. In some embodiments, the merge of the row pose list with the global pose list is accomplished by combining the poses stored for the currently processed row with the global pose list and clustering poses that are determined to represent a same point of correspondence based on their search space proximity. In various embodiments, poses having a sub-maximum response relative to other poses in their cluster may be considered redundant and may be deleted from the global pose list. In various embodiments, the innermost loop 1202 repeats for all search rows in the binary image, and the outermost loop 1201 repeats for all affine transformations of a search. In some embodiments there may be an early termination of the search in a case where at least a certain predetermined level of response or greater is obtained from at least one of the comparator-accumulators 400 during the search as evidenced by information in the global pose list. Once the outermost loop 1201 has completed, the method continues to S40.

In S40, the global pose list is processed to form search results. In various embodiments, the global pose list is searched to find a global maximum response among all responses. In some embodiments, a number of responses in the global pose list that meet a predetermined criteria are counted. In various embodiments, the control processor 201 is configured to output data from the vision sensor 200 based on the search results. With reference to FIGS. 3 and 9, in various embodiments, the vision sensor 200 is configured to provide data to the device 240 based on the search results. In various embodiments, the vision sensor 200 is configured to provide a trigger signal to the device 240 in a case where it is determined that one or more features have been found in the binary image based on the search results. In some embodiments the device 240 is a type of device that is capable of processing image data and the vision sensor 200 is configured to transmit selected image data to the device 240 based on the search results.

In some embodiments, the control processor 201 is configured to perform adaptive gain or exposure control based on the search results to adjust parameters for acquisition of images of the same or different objects to a specific value or range, such as parameters used to control exposure times used with the pixel array 208. In various embodiments, the control processor 201 is configured to cycle through all or a subset of different gain, exposure, and/or offset parameters. Thereafter, in various embodiments, the images acquired during the cycling of the parameters are processed to select a good image or images for further processing. In some embodiments, the control processor 201 varies other parameters used to acquire the images, and searches the images to identify particular candidate images for further processing internally or to be transmitted to a device, such as various embodiments of the device 240, for further processing. For example, in an ID reader application, in various embodiments the vision sensor 200 acquires multiple images and searches the images using various models to identify candidate images for further processing. In various embodiments, the vision sensor 200 can replace an ID reader.

In some embodiments, the vision sensor 200 is configured to track one or more features as they move through a scene based on search results from searches performed on multiple consecutive captured images using a model of the one or more features. In some embodiments, the control processor 201 is configured to load particular programs, models, or other data into the general purpose memory 202 from an external device based on search results of searches. Also, in various embodiments, the control processor 201 is configured to control one or more optical devices (not shown) to focus the optical devices based on search results of searches.

In some embodiments, the vision sensor 200 is configured to gather evidence concerning movements of one or more objects in a scene based on search results from searches performed on multiple consecutive captured images using a model of one or more features that represent the one or more objects, and is configured to predict a future location of the one or more objects based on the gathered evidence. Also, in some embodiments, the vision sensor 200 is configured to acquire images and to gather evidence as to whether lighting of a scene is adequate for a particular purpose based on an analysis of successive images. In some embodiments, the vision sensor 200 may be configured to make predictions or decisions based on results from processing images and to successively refine the predictions or decisions as the vision sensor 200 continues to acquire and analyze further images.

In some embodiments, the vision sensor 200 is configured to use a global shutter operation in which all pixel circuits 206 in the pixel array 208 are reset and then exposed simultaneously for a specified period of time to accumulate charge from light for a capture operation. In some embodiments, the vision sensor 200 is configured to use a rolling shutter operation in which all pixel circuits 206 in a same row of the pixel array 208 are reset and then exposed simultaneously for a specified period of time, and where the capture process continues row-by-row through the pixel array 208. In various other embodiments, other types of shutter operations may be employed.

In various embodiments, the vision sensor 200 is configured to obtain an image using a type of shutter operation in which an exposure pattern of the pixel array 208 is set according to exposure information that changes over time based at least partially on charge accumulated in at least a portion of the pixel array 208. In such embodiments, the vision sensor 200 may include circuitry as disclosed in U.S. Provisional Patent App. Ser. No. 61/020,560, entitled "CMOS Image Sensor for Machine Vision", filed Jan. 11, 2008, the entire contents of which are incorporated by reference herein. In various embodiments, a type of shutter operation to be used by the vision sensor 200 may be determined based on search results of searches performed on images using one or more models. Also, in various embodiments, parameters for shutter operations, such as exposure times, or the like, may be determined based on search results of searches performed on images using one or more models.

The embodiments disclosed herein are to be considered in all respects as illustrative, and not restrictive of the invention. For example, other types of models of features than those described above may be employed in various embodiments, and designs of vision sensors in various embodiments for processing such models may be tailored for processing the models. The present invention is in no way limited to the embodiments described above. Various modifications and changes may be made to the embodiments without departing from the spirit and scope of the invention. Various modifications and changes that come within the meaning and range of equivalency of the claims are intended to be within the scope of the invention.

What is claimed is:

1. A single chip vision sensor, comprising:
a pixel array; and
one or more circuits configured to search an image for one or more features using a model of the one or more features, to record one or more poses of the model relative to the image that result in at least a partial match between the model and the image, and to transmit data of the image only if at least one of the one or more features are found in the image;
wherein said one or more circuits comprising a plurality of comparators for comparing, concurrently with each other, one or more corresponding values obtained based on data of the image with one or more values of the model.

2. The single chip vision sensor of claim 1,
said one or more circuits configured to process one or more signals provided from the pixel array to generate said image.

3. The single chip vision sensor of claim 1,
said model including a plurality of model instructions that each include a corresponding coordinate with respect to a model reference point.

4. The single chip vision sensor of claim 1,
said one or more circuits configured to transform one or more coordinates of the model in accordance with one or more affine transform values.

5. The single chip vision sensor of claim 1,
said one or more circuits configured to compare the model, after transforming one or more coordinates of the model, with the image for each of a plurality of positionings of the model relative to the image concurrently.

6. The single chip vision sensor of claim 5,
said plurality of positionings including positionings of a reference point of the model at a plurality of locations in a row of the image.

7. The single chip vision sensor of claim 1,
said one or more circuits comprising an image address processor configured to transform coordinates of the model into transformed coordinates based at least partially on one or more transform values.

8. The single chip vision sensor of claim 7,
said one or more circuits further comprising a plurality of image memory devices for storing image data of the image and for outputting data concurrently with each other in a case where the plurality of image memory devices are accessed using at least one of said transformed coordinates.

9. The single chip vision sensor of claim 7,
said one or more circuits further comprising an image data selector configured to receive data of the image and to shift the data by an amount that is based on at least one of said transformed coordinates.

10. The single chip vision sensor of claim 9,
said one or more circuits further comprising a plurality of accumulators, each accumulator of the plurality of accumulators configured to receive an accumulation increment of the model and to selectively perform accumulation to accumulate the accumulation increment based on an output of a corresponding comparator of the plurality of comparators.

11. The single chip vision sensor of claim 10,
said one or more circuits further comprising a model data shifter for shifting the one or more values and the accumulation increment of the model within the model data shifter and for providing the one or more values to the plurality of comparators and the accumulation increment to the plurality of accumulators.

12. A method in a single chip vision sensor, comprising:
obtaining an image based at least partially on sensed light;
searching the image for one or more features using a model of the one or more features;
recording one or more poses of the model relative to the image that result in at least a partial match between the model and the image; transmitting data of the image only if at least one of the one or more features are found in the image; and outputting information based on a result of said searching.

13. The method of claim 12, said searching comprising:

comparing the model, after transforming one or more coordinates of the model, with the image for each of a plurality of positionings of the model relative to the image concurrently.

14. The method of claim 13, said plurality of positionings including positionings of a reference point of the model at a plurality of locations in a row of the image.

15. The method of claim 12, said searching comprising:

transforming coordinates of the model into transformed coordinates based on one or more transform values.

16. The method of claim 15, said searching further comprising:

causing a plurality of image memory devices to output data concurrently with each other by accessing the plurality of image memory devices using at least one of said transformed coordinates.

17. The method of claim 15, said searching further comprising:

shifting data of the image by an amount that is based on at least one of said transformed coordinates.

18. The method of claim 12, said searching comprising:

causing a plurality of comparators to compare, concurrently with each other, one or more corresponding values obtained based on data of the image with one or more values of the model.

19. The method of claim 18, said searching further comprising:

selectively performing accumulation to accumulate an accumulation increment in an accumulator based on an output of a corresponding comparator of the plurality of comparators.

20. A system, comprising:

a single chip vision sensor configured to obtain an image based at least partially on sensed light, to search the image for one or more features using a model of the one or more features, to record one or more poses of the model relative to the image that result in at least a partial match between the model and the image, and to transmit image data for regions of interest in the image that are determined based on identified features from the search, wherein said searching further comprising a plurality of comparators for comparing, concurrently with each other, one or more corresponding values obtained based on data of the image with one or more values of the model; and a device for receiving one or more signals from the single chip vision sensor and for controlling an operation based at least partially on the one or more signals.

21. A single chip vision sensor, comprising:

a pixel array; and one or more circuits configured to search an image for one or more features using a model of the one or more features, to record one or more poses of the model relative to the image that result in at least a partial match between the model and the image, and to transmit data of the image only if at least one of the one or more features are found in the image;

wherein said one or more circuits comprising a priority encoder for indicating positionings of the model in accordance with a binary tag word that is formed based on results of comparisons of the model, after one or more coordinates of the model have been transformed, with the image.

* * * * *